United States Patent
Lango

(10) Patent No.: US 7,386,674 B1
(45) Date of Patent: Jun. 10, 2008

(54) METHOD AND APPARATUS TO PROVIDE A UNIFIED READAHEAD SCHEME FOR MULTIPLE SOURCES

(75) Inventor: Jason Ansel Lango, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 237 days.

(21) Appl. No.: 11/114,729

(22) Filed: Apr. 25, 2005

(51) Int. Cl.
G06F 12/00 (2006.01)

(52) U.S. Cl. .................. 711/137; 711/156; 711/158; 711/162; 707/204

(58) Field of Classification Search ............. 711/137, 711/156, 158, 162; 707/204
See application file for complete search history.

(56) References Cited

U.S. PATENT DOCUMENTS

| 5,956,745 | A  | * | 9/1999 | Bradford et al. ........... 711/137 |
| 6,202,130 | B1 | * | 3/2001 | Scales et al. ............... 711/137 |
| 6,253,289 | B1 | * | 6/2001 | Bates et al. ................ 711/137 |
| 6,260,115 | B1 | * | 7/2001 | Permut et al. ............. 711/134 |
| 6,393,528 | B1 | * | 5/2002 | Arimilli et al. ............ 711/137 |
| 6,557,079 | B1 | * | 4/2003 | Mason et al. .............. 711/137 |
| 7,333,993 | B2 | * | 2/2008 | Fair .......................... 707/100 |
| 2002/0010838 | A1 | * | 1/2002 | Mowry ...................... 711/128 |
| 2003/0009632 | A1 | * | 1/2003 | Arimilli et al. ............ 711/137 |
| 2005/0114289 | A1 | * | 5/2005 | Fair .............................. 707/1 |
| 2005/0154825 | A1 | * | 7/2005 | Fair .......................... 711/113 |

* cited by examiner

*Primary Examiner*—Stephen C Elmore
(74) *Attorney, Agent, or Firm*—Perkins Coie LLP

(57) ABSTRACT

A system and method are provided to manage configuration of multiple file server appliances. The method comprises receiving a read request and, responsive to the receiving of the read request, utilizing a readahead engine to issue a readahead request. A portion of the readahead request that can be read from a local storage is delivered to the local storage system. A portion of the readahead request that can be read from a remote storage is delivered to the remote storage system.

26 Claims, 21 Drawing Sheets

|  |  |
|---|---|
| PROTOCOL REQUEST DATA STRUCTURE | _1000_ |
| FILE SYSTEM ID | _2005_ |
| LOCK DEFAULT PCPI | _2010_ |
| CHECK PCPI CONFIGURATION | _2015_ |
| PCPI NAME LENGTH | _2020_ |
| PCPI INFORMATION | _2025_ |
| PCPI NAME | _2030_ |
| ⋮ | _2035_ |

|  |  |
|---|---|
| IDENTIFIER | _2105_ |
| CP COUNT | _2110_ |
| PCPI CREATION TIME (SECONDS) | _2115_ |
| PCPI CREATION TIME (MICROSECONDS) | _2120_ |
| ⋮ | _2125_ |

| | | |
|---|---|---|
| PROTOCOL RESPONSE DATA STRUCTURE | 1100 | |
| PCPI INFORMATION | 2100 | |
| BLOCKS USED | 2210 | |
| BLOCKS_HOLES | 2215 | |
| BLOCKS_OVERWRITE | 2220 | |
| BLOCKS_HOLES_CIFS | 2225 | |
| INODES USED | 2230 | |
| TOTAL NO. OF INODES | 2235 | |
| ⋮ | 2240 | |

| | | |
|---|---|---|
| PROTOCOL REQUEST DATA STRUCTURE | 1000 | |
| FILE SYSTEM ID | 2305 | |
| PCPI ID | 2310 | |
| ⋮ | 2315 | |

METHOD AND APPARATUS TO PROVIDE A UNIFIED READAHEAD SCHEME FOR MULTIPLE SOURCES

FIELD OF THE INVENTION

At least one embodiment of the present invention pertains to storage systems and, more specifically, to a method and apparatus for unified readahead scheme for multiple sources.

BACKGROUND

A storage system is a computer that provides storage services relating to the organization of information on storage devices, such as disks. A storage system typically accesses one or more storage volumes. A storage volume comprises physical storage devices defining an overall logical arrangement of storage space, and each volume is usually associated with its own file system. A storage system typically includes a storage operating system that logically organizes the information as a set of data blocks stored on disks. In a file-based deployment, such as a network attached storage (NAS) environment, a storage system may be a file server, the operating system of which implements a file system to logically organize the data blocks as a hierarchical structure of addressable files and directories on the disks. A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may also opt to maintain a near optimal layout such that the data is substantially contiguously arranged on disks. The optimal disk layout results in efficient access operations, particularly for sequential read operations, directed to the disks.

A storage system may be configured to operate according to a client/server model of information delivery to thereby allow many client systems (clients) to access shared resources, such as files, stored on the storage system. The storage system is typically deployed over a computer network comprising a geographically distributed collection of interconnected communication links, such as Ethernet links, that allow clients to remotely access the shared information (e.g., files) on the storage system. The clients typically communicate with the storage system by exchanging discrete frames or packets of data formatted according to predefined network communication protocols, such as the Transmission Control Protocol/Internet Protocol (TCP/IP). In this context, a protocol consists of a set of rules defining how the interconnected computer systems interact with one another.

In a file-based deployment, clients employ a semantic level of access to files and file systems stored on the storage system. For instance, a client may request to retrieve ("read") or store ("write") information in a particular file stored on the storage system. The client requests identify one or more files to be accessed without regard to specific locations, e.g., data blocks, in which the requested data are stored on disk. The storage system converts the received client requests from file-system semantics to corresponding ranges of data blocks on the storage disks. In the case of a client "read" request, data blocks containing the client's requested data are retrieved and the requested data is then returned to the client.

A read stream is defined as a predictable sequence of read operations. In other words, after the read stream's first request is received, every subsequent client request in the read stream logically "extends" a contiguous sequence of file offsets in the file accessed by the stream's previous request. Accordingly, a read stream may be construed by the file system as a sequence of client requests that directs the storage system to retrieve a sequence of data blocks assigned to consecutively numbered file block numbers (fbns). For instance, the first request in the read stream may retrieve a first set of data blocks assigned to the fbns 10 through 19, the stream's second request may retrieve data blocks whose fbns equal 20 through 25, the third request may retrieve the data blocks assigned to the fbns 26 through 42, and so on. It is noted that client requests in the read stream may employ file-based or block-based semantics, so long as they instruct the storage system to retrieve data from the stream's logically contiguous range of file offsets. A long sequential read may be divided into multiple sequential read operations. A read stream composed of sequential reads separated by unread regions, e.g. read for fbns 10 through 20, read for fbns 30 through 40, and read for fbns 50 through 60 may be referred to as spanning reads.

Operationally, the storage system typically identifies a read stream based on an ordered sequence of client accesses to the same file. Upon identifying a read stream, the storage system may employ speculative readahead operations to retrieve data blocks that are likely to be requested by future client read requests. These "readahead" blocks are typically retrieved from disk and stored in memory (i.e., buffer cache) in the storage system, where each readahead data block is associated with a different file-system volume block number (vbn). Conventional readahead algorithms are often configured to "prefetch" a predetermined number of data blocks that logically extend the read stream. For instance, for a read stream whose client read requests retrieve a sequence of data blocks assigned to consecutively numbered fbns, the file system may invoke readahead operations to retrieve additional data blocks assigned to fbns that further extend the sequence, even though the readahead blocks have not yet been requested by client requests in the read stream.

A file system may utilize a component responsible for "prefetching" data blocks from mass storage devices that are local to the storage system. Such component may be termed a readahead engine. A storage system, such as a file server, may implement a file system with a readahead engine configured to optimize the amount of readahead data retrieved from a local device for each read stream managed by the file system. The readahead engine could rely on various factors to adaptively select an optimized readahead size for each read stream. Such factors may include the number of read requests processed in the read stream, an amount of client-requested data requested in the read stream, a read-access style associated with the read stream, and so forth. The readahead engine could also be configured to minimize cache pollution (i.e., loading data into the cache that will not be reused before it is evicted) by adaptively selecting when readahead operations are performed for each read stream and determining how long each read stream's retrieved data is retained in memory.

Such an optimized readahead module has been utilized to process requests that require access to locally stored data, but not for remote requests. An existing technique arbitrarily extends the length of remote reads in hopes that the client read access pattern comprises long sequential reads. This approach, however, sacrifices performance on random or spanning reads and fails to tune the read length to the clients' access pattern.

A system where one file server is used as a caching server and another file server is used as an origin server may be referred to as a multi-node caching system.

In a multi-node caching system, the system that is in direct contact with the client (e.g., a file sever acting as a caching intermediary between a client and an origin file server) may have the best information as to the client's intent, as the front-end (client-facing) system will have observed all of the client's past transactions. On the other hand, the back-end (remote/origin) system may have gaps in its knowledge of client access patterns due to the effects of caching at the front-end—e.g., client requests for data that can be satisfied by the file system that is local to the caching server, (cache hits), are not observed by the back-end system. In a similar context, existing readahead engines do not implement a method to pass information about the client access patterns to the back-end system, and thus are not capable of optimizing inputs/outputs (I/Os) to its data drives. It is desirable to utilize an optimized readahead module to process read requests without regard to whether the read request requires local or remote access.

SUMMARY

A system and method are described to provide a unified readahead scheme for multiple sources. The method comprises receiving a read request and, responsive to the receiving of the read request, utilizing a readahead engine to issue a readahead request. A portion of the readahead request that can be read from a local storage is delivered to the local storage system. A portion of the readahead request that can be read from a remote storage is delivered to the remote storage system.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 3A is a schematic diagram of an exemplary buffer tree, according to one embodiment of the present invention;

FIG. 16 is a schematic block diagram of a lock PCPI (LOCK_PCPI) request data structure in accordance with an embodiment of the present convention;

FIG. 17 is a schematic block diagram of a PCPI information data structure in accordance with embodiment of the present convention;

FIG. 18 is a schematic block diagram of a lock PCPI (LOCK_PCPI) response data structure in accordance with an embodiment of the present convention;

FIG. 19 is a schematic block diagram of an unlock PCPI (UNLOCK_PCPI) request data structure in accordance with embodiment of the present convention;

DETAILED DESCRIPTION

According to one embodiment of the present invention, a method and system provide a unified readahead scheme to take advantage of the efficient I/O scheduler (read-ahead engine) implemented for a write anywhere file system on top of both local and remote filesystems. The method comprises coalescing common remote requests, aggressive pipelining, as well as concurrently issuing requests to local and remote disks.

The unified readahead scheme may be utilized, for example, in the context of sparse volumes. A sparse volume is a data container or volume wherein one or more files contained therein have a block or blocks of data that require a special retrieval operation to obtain the data. The missing data of an absent block is stored on an alternate, possibly remote, source and is illustratively retrieved using a remote fetch operation.

A sparse configuration file containing metadata, such as identification of the remote backing store and volume therein to utilize, is stored on the storage system. In addition, appropriate block pointer(s) of some file(s) in the filesystem are marked (labeled) with special ABSENT value(s) to identify that certain block(s), including data and/or indirect blocks, within the sparse volume are not physically located on the storage system serving the volume. The special ABSENT value further alerts the file system that the data is to be obtained from the alternate source, e.g., a remote backing store.

The use of a sparse volume permits rapid access to data that is not physically stored on the local disk of the storage system without requiring transfer of an entire copy of the volume before serving data access requests. The use of sparse volumes may be beneficial in a number of diverse applications including remote file caching, where a file server utilizing a sparse volume acts as a caching intermediary (a caching server) between a client and an origin file server.

Figure 1:
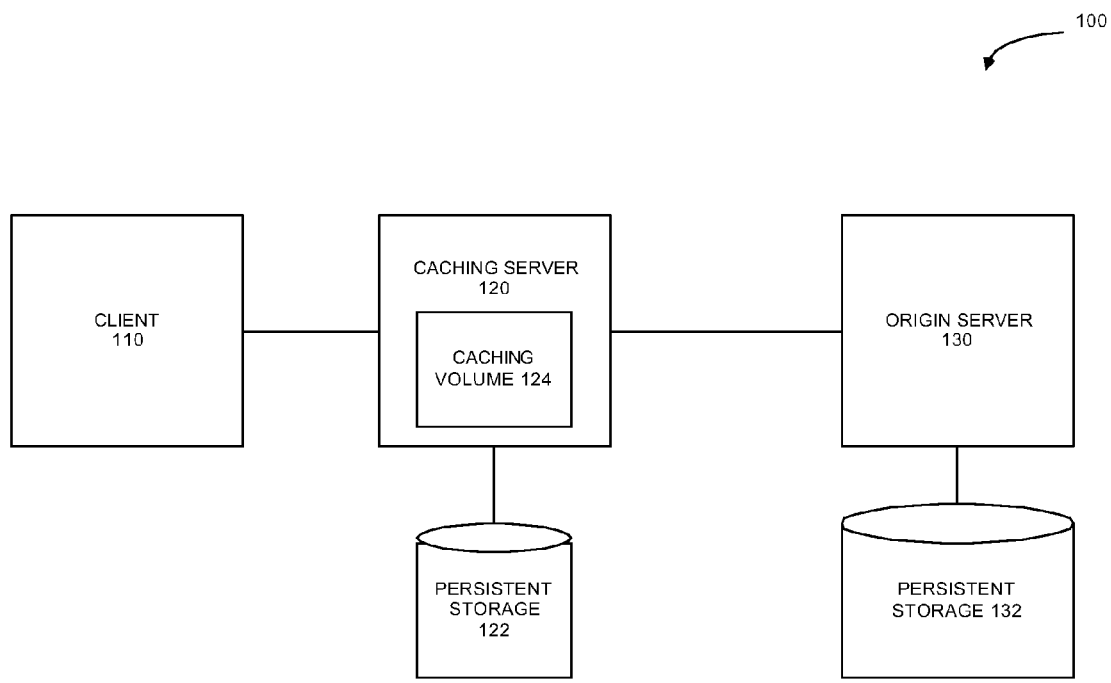
FIG. 1 is a schematic block diagram of a network environment within which the present invention may be implemented, according to one illustrative embodiment.

FIG. 1 is a schematic block diagram of an environment 100 including a client 110, a caching server 120 with an associated persistent storage component 122, and an origin server 130 with an associated persistent storage component 132. In one embodiment, the persistent storage component 132 has significantly larger storage capacity that the persistent storage component 122. In one embodiment, the caching server 120 is positioned in a closer proximity to the client 120 than the origin server 140.

The caching server 120 retrieves and "caches" the data requested by the client 110 and stored on the origin server 130. The caching server 120 supports a special type of a write anywhere file system volume, a so-called caching volume 124. The caching volume 124, in one embodiment, mirrors certain portions of an origin volume 134 associated with the origin server 130 and may be implemented as a sparse volume. The caching volume 124 may have very little information at the time of its creation. Whenever the client 110 requests data access, the caching volume 124 first determines whether the piece of data that the client 110 is asking for is stored locally in the persistent storage 122 and, if the requested data is not stored locally, a remote request is made to the origin server 130. Thus, the caching server 120 is treated by the client 110 as an authoritative copy of data stored at the origin server 130.

Figure 2:
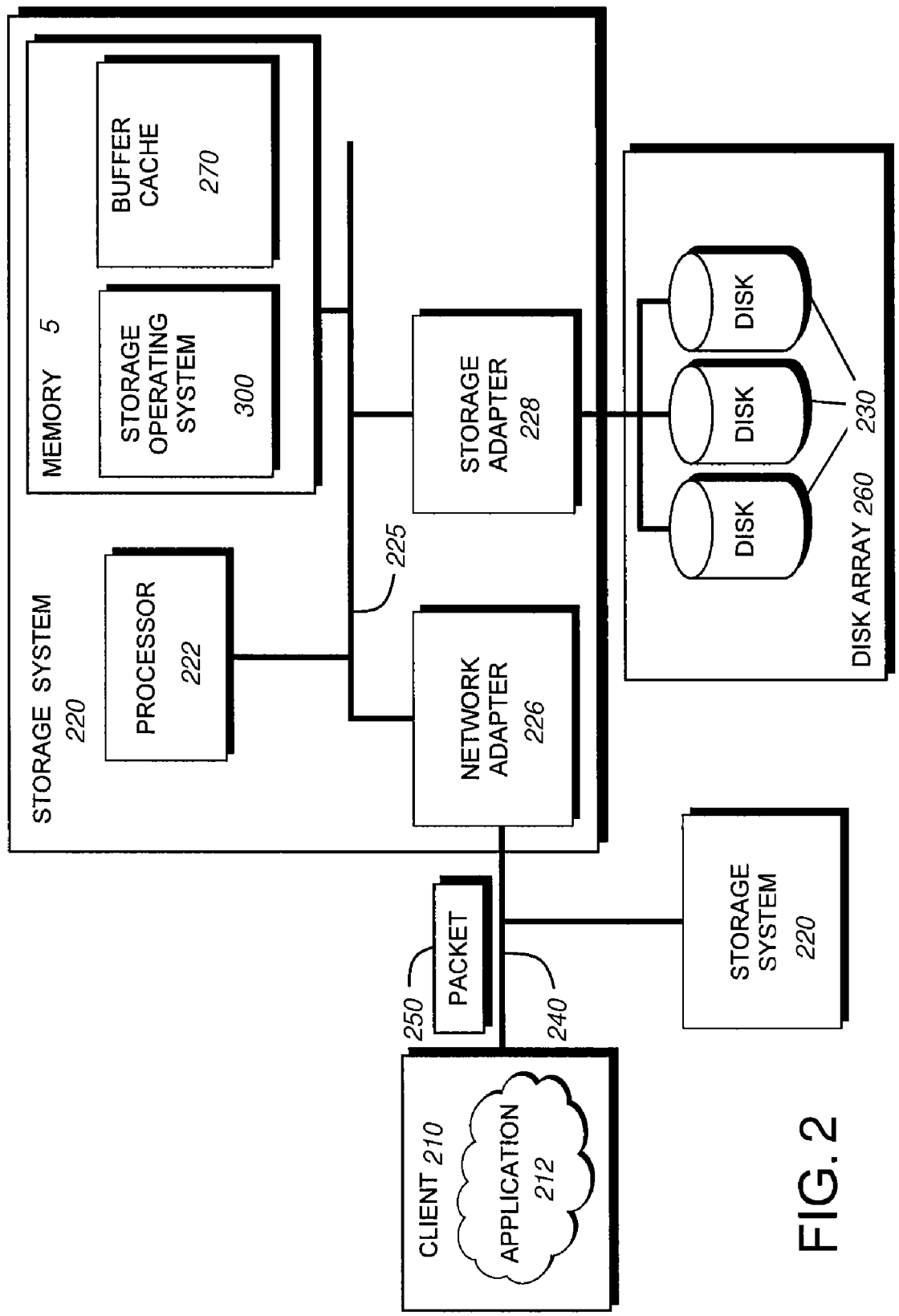
FIG. 2 illustrates a block diagram of a storage system, according to one embodiment of the present invention.

FIG. 2 is a block diagram of a storage system 200 (such as, for example, the caching server 120 or the origin server 130) that may be advantageously used with the present invention. The storage system provides storage service relating to the organization of information on storage devices, such as disks 230 of a disk array 260. The storage system 220 comprises a processor 222, a memory 224, a network adapter 226 and a storage adapter 228 interconnected by a system bus 225. The storage system 220 also includes a storage operating system 300 that preferably implements a high-level module, such as a file system, to logically organize the information as a hierarchical structure of directories, files and special types of files called virtual disks (hereinafter "blocks") on the disks.

In the illustrative embodiment, the memory 224 comprises storage locations that are addressable by the processor and adapters for storing software program code. A portion of the memory may be further organized as a buffer cache 270 for storing certain data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the system 220 by, among other operations, invoking storage operations executed by the storage system. It will be apparent to those skilled in the art that other processing and memory devices, including various computer readable media, may be used for storing and executing program instructions pertaining to the inventive technique described herein.

The network adapter 226 comprises the mechanical, electrical and signaling circuitry needed to connect the storage system 220 to a client 210 over a computer network 140, which may comprise a point-to-point connection or a shared medium, such as a local area network (LAN) or wide area network (WAN). Illustratively, the computer network 240 may be embodied as an Ethernet network or a Fibre Channel (FC) network. The client 210 may communicate with the storage system over network 140 by exchanging discrete frames or packets of data according to pre-defined protocols, such as the Transmission Control Protocol/Internet Protocol (TCP/IP).

The client 210 may be a general-purpose computer configured to execute applications 212. Moreover, the client 210 may interact with the storage system 220 in accordance with a client/server model of information delivery. That is, the client may request the services of the storage system, and the system may return the results of the services requested by the client, by exchanging packets 250 over the network 240. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 228 cooperates with the storage operating system 300 executing on the system 220 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 260. The storage adapter includes input/output (I/O) interface circuitry that couples to the disks over an I/O interconnect arrangement, such as a conventional high-performance, FC serial link topology.

Storage of information on array 260 is preferably implemented as one or more storage "volumes" that comprise a collection of physical storage disks 230 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data stripes across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Figure 3:
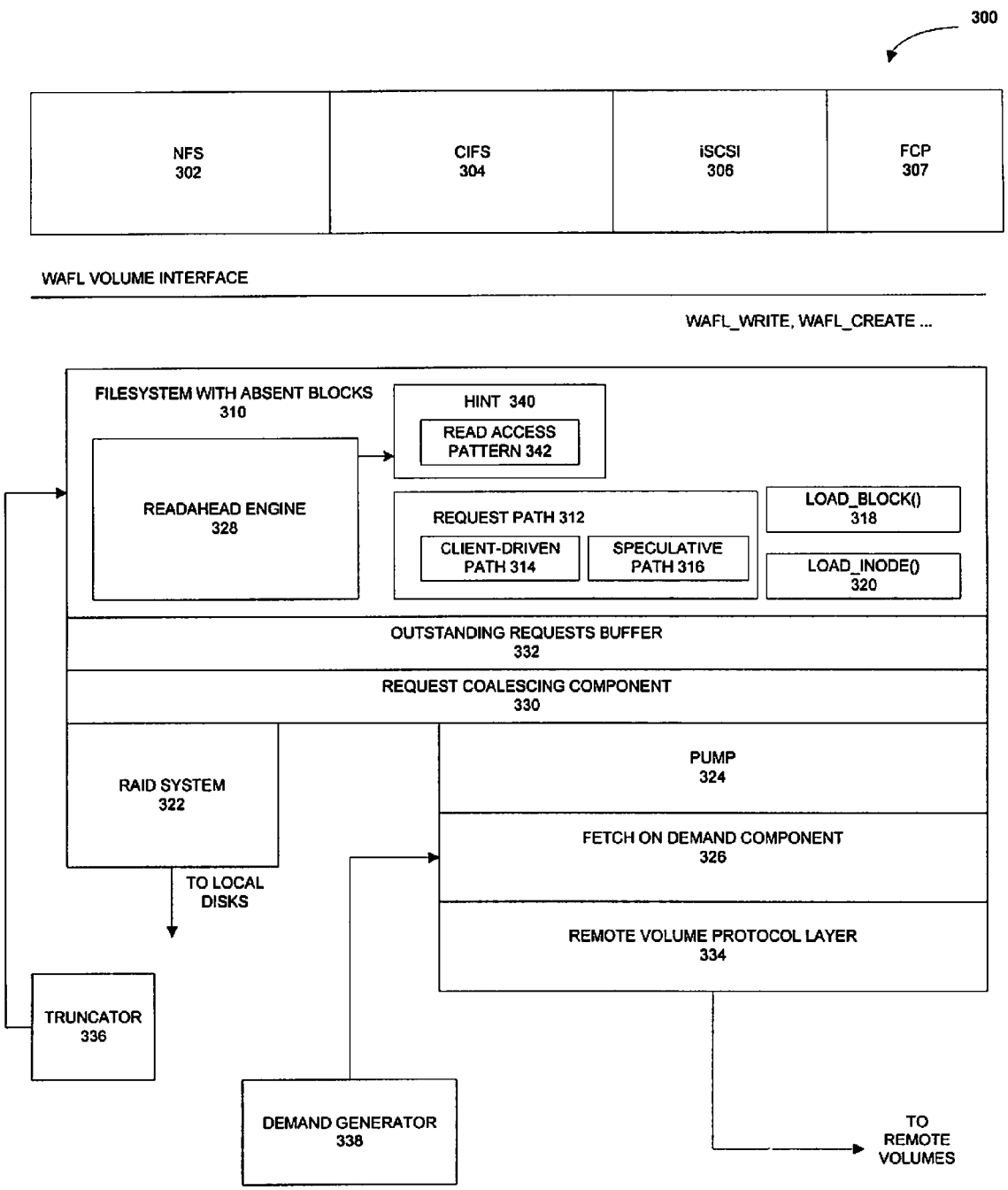
FIG. 3 is a schematic diagram of a storage operating system, according to one embodiment of the present invention.

FIG. 3 is a schematic diagram of a storage operating system 300 that may be running on the caching server 120, according to one embodiment of the present invention. The storage operating system comprises a series of software layers organized to form an integrated network protocol stack or, more generally, a multi-protocol engine that provides data paths for clients to access information stored on the storage system using block and file access protocols. A file system protocol layer provides multi-protocol file access and, to that end, includes support for such protocols as NFS protocol 302, CIFS protocol 304, and the Small Computer Systems Interface (SCSI) protocol encapsulated over FC (FCP) 307 or encapsulated over TCP/IP/Ethernet (iSCSI) 306. In addition, the storage operating system includes a storage module embodied as a RAID system 322 that manages the storage and retrieval of information to and from the local volumes/disks in accordance with I/O operations.

The storage operating system 300 further comprises a remote volume protocol layer 334 that interfaces with file system 310. The remote volume protocol is generally utilized for remote fetching of data blocks that are not stored locally on disk. The remote volume protocol may be further utilized in storage appliance to storage appliance communication to fetch absent blocks in a sparse volume in accordance with the principles of the present invention. The remote volume protocol is further described below in connection with FIGS. 5 through 32. However, it should be noted that any other suitable file or block based protocol that can retrieve data from a remote backing store, including, e.g., the NFS protocol, can be advantageously used with the present invention.

It should be noted that, in alternate embodiments, conventional file/block level protocols, such as the NFS protocol, or other proprietary block fetching protocols may be used in place of the remote volume protocol within the teachings of the present invention.

The file system 310 is illustratively a message-based system that provides logical volume management capabilities for use in access to the information stored on the storage devices, such as disks. That is, in addition to providing file system semantics, the file system 310 provides functions normally associated with a volume manager. These functions include (i) aggregation of the disks, (ii) aggregation of storage bandwidth of the disks, and (iii) reliability guarantees, such as mirroring and/or parity (RAID). The file system 310 illustratively implements a write-anywhere file system having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file, which contains an inode for each stored file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file, as illustrated in FIG. 3A. FIG. 3A is a schematic block diagram of an exemplary local buffer tree 1000 showing ABSENT blocks and pointers in accordance with an embodiment of the present invention. The local buffer tree 1000 is illustratively located on a volume (a sparse volume) of the storage system 300. At the root of the buffer tree 1000 is an inode 1005 that includes a plurality of pointers 1010a, b, c. In an initial state, each pointer 1010 contains an ABSENT value and, as such, references (among other blocks) "absent" indirect block 1015. Note that a full copy of buffer tree 1000 is also stored on a backing store of, e.g., remote storage server 130.

Operationally, the file system 310 receives client requests that have been processed by various software layers of the integrated network protocol stack. For example, a client request received at a network adapter 226 may be processed by a network driver, which, when appropriate, forwards the request to network protocol and file access layers for additional processing. The client request is then formatted as a file-system "message" that can be passed to the file system 310. The message may specify, among other things, a client-requested file or directory (e.g., typically represented by an inode number), a starting offset within the requested file or directory, and a length of data to write or retrieve following the starting offset.

Because the file system 310 manipulates on-disk data in units of fixed-sized data blocks, e.g., 4 kB blocks, the file system may have to convert the (inode, offset, length) values received in the file-system message into units of data blocks (e.g., fbns), if they are not already so formatted. For example, suppose an 8 kB client-requested file occupies two consecutive 4 kB on-disk data blocks which are assigned fbns equal to 11 and 12, respectively. Further assume that these two data blocks are accessible through a set of pointers stored in an inode whose inode number equals 17. Next, suppose that a client requests to access the latter 6 kB of the file's data, i.e., the last 2 kB in fbn number 11 and the entire 4 kB in fbn number 12. In this case, the file system 260 may receive a file-system message that identifies the requested data as: (inode=17, file offset=2 kB, length=6 kB). Since the file system manipulates data in units of data blocks, the file system converts the received file offset and length values into units of data blocks so as to identify which data blocks contain the client-requested data, e.g., (inode=17, starting data block=fbn 11, data blocks to read=2 blocks).

Having identified which data blocks, e.g., fbns 11 and 12, store the client-requested data, the Load_Block( ) function 318 of the file system 310 determines whether an appropriate block pointer of a file is marked as ABSENT and, if so, transmits a remote fetch (e.g., read) operation from the storage system (e.g., the caching server 120) to the remote backing store (e.g., the origin server 130) to fetch the required data. The fetch operation requests one or more file block numbers of the file stored on the backing store. It should be noted that while the present description is written in terms of a single backing store, the principles of the present invention may be applied to an environment where a single sparse volume is supported by a plurality of backing stores, each of which may support the entire or a subset of the sparse volume. As such, the teachings should not be taken to be limited to single backing stores.

The backing store retrieves the requested data from its storage devices and returns the requested data to the storage system, which processes the data access request and stores the returned data in its memory. Subsequently, the file system 310 "flushes" (writes) the data stored in memory to local disk during a write allocation procedure. The file system 310 assigns pointer values (other than ABSENT values) to indirect block(s) of the file to thereby identify location(s) of the data stored locally within the volume.

In order to accommodate remote fetches associated with ABSENT blocks of the file system 310, the storage operating system 300 includes a fetch on demand (FOD) component 326. A pump 324 is responsible for scheduling, throttling, and resource managing of FOD requests.

In addition to retrieving data blocks containing the client-requested data, the file system 310 also may generate speculative read requests that instruct the RAID system 322 or the FOD 326 to retrieve additional "readahead" data blocks from the disks 160 or from the remote server respectively. These readahead data blocks may correspond to a range of data blocks (e.g., fbns) that logically extend a read stream containing the received client request, although the readahead blocks themselves have not yet been requested. Like the client-requested data blocks, the readahead data blocks are retrieved by the disk software layers copied into appropriate location accessible to the file system 260. Client driven requests are processed via a client-driven request path 314 of a request path 312, while speculative requests are processed via speculative request path 316. In general, the amount of readahead data to be retrieved is selected based on one or more factors. The one or more factors may include historical information about prior requests associated with the data container. In one embodiment, the issuing of the readahead requests to the remote storage system include communicating a hint to the remote storage system. The hint can be generated based on the historical information.

In accordance with an illustrative embodiment, the storage operating system 300 maintains a separate set of readahead metadata for each of a plurality of concurrently managed read streams. As used herein, a "read stream" is defined as a set of one or more client requests that instructs the storage operating system 300 to retrieve data from a logically contiguous range of file offsets (e.g., fbns) within a requested file. The operating system 300 may employ speculative readahead operations for prefetching one or more data blocks that are likely to be requested in the read stream by future client read requests. A file or directory supporting multiple concurrent read streams may be associated with a plurality of different readsets, e.g., accessible through an inode associated with the file or directory.

The file system 310 further comprises a readahead engine 328 to generate a disk I/O "hint" 340 for retrieving data blocks 320 containing client-requested data and/or readahead data. A hint (e.g., the hint 340), in one embodiment, is a data structure indicating a read access pattern 342 that the requesting client will likely employ to retrieve data from the file or directory. It will be noted, that, in one embodiment, the read ahead engine 328 may optimize to prefetch data required by spanning reads, or even more complicated read streams, as might be envisioned by a person of ordinary skill in the art.

In response to receiving a client read request, the file system 310 may first attempt to locate the client-requested data blocks and their associated readahead blocks in the buffer cache 270. For those data blocks that are not located in the buffer cache 270, the file system generates the disk I/O hint to instruct the disk subsystem layers (e.g., RAID and SCSI layers) which data blocks to retrieve from the storage disks 160. If the client read request requires remote access, such as in a case where the pointer to the requested block is marked as ABSENT, then the I/O "hint" is communicated to the remote backing system (here, the origin server 130 of FIG. 1). Thus, readahead occurs regardless of whether the client read request requires local or remote access, and the techniques utilized by the readahead engine 328 to generate the I/O "hint" benefit not only the local but also remote reads.

Illustratively, the disk I/O hint contains, among other things, an indication of a starting data block, an indication of the total number of blocks to retrieve, an indication of how many of the data blocks to retrieve are "must-read" data blocks, an indication of how many of the data blocks to retrieve are "speculative" readahead data blocks and zero or more I/O flag values. Those skilled in the art will appreciate that the disk I/O hint may contain other information that is passed from the file system 310 to the RAID system 322 and the FOD 326.

In accordance with the illustrative embodiment, the number of speculative data blocks identified by the I/O "hint" equals zero unless one or more "readahead" conditions are satisfied. If each of the readahead conditions is satisfied, then the file system 310 sets the number of readahead data blocks in the disk I/O hint equal to a predetermined readahead size value. For example, a readahead condition may prohibit retrieval of readahead data blocks unless the range of data blocks (e.g., fbns) requested by the client read request "extends" a read stream past an associated next readahead value.

In accordance with an illustrative embodiment, the readahead engine 328 is configured to optimize the amount of readahead data retrieved for each read stream managed by the file system. To that end, the file system relies on various factors to adaptively select an optimized readahead size for each read stream. Such factors may include an amount of client-requested data requested in the read stream, the number of read requests processed in the read stream, a read-access style associated with the read stream's file or directory, and so forth. For example, if the client requests less than 64 kB of data, then the readahead engine 328 sets the readahead size equal to two times a predetermined number N of data blocks, e.g., where N equals 32 data blocks. If the client requests more than 64 kB and less than 128 kB, then the readahead size is set equal to four times the predetermined number of data blocks. Similarly, if the client requests between 128 kB and 256 kB of data, then the readahead size is set equal to six times the predetermined number of data blocks.

The storage system implementing a file system configured to optimize the amount of readahead data retrieved for each read stream is described in more detail in U.S. patent application Publication no. 2005/0154825, entitled *Adaptive File Readahead Based on Multiple Factors* by Robert L. Fair, filed on Jan. 8, 2004, which is hereby incorporated by reference as though fully set forth herein.

In one embodiment, readahead operations may be performed utilizing aggressive pipelining, i.e., issuing concurrently a plurality of readahead requests. Because remote readahead requests may arrive to the backing store (e.g., the origin server 130) in an arbitrary order, the storage system 300 utilizes the I/O "hints" generated by the readahead engine 328 to indicate that the plurality of readahead requests together form one larger readahead request (e.g., by associating a header with each request for a data block from the plurality of requests indicating that the data block is from the plurality of requested data blocks). It will be noted that a readahead request may include a first portion associated with a local request and a second portion associated with a remote request.

The operating system 300 further comprises an optional truncator 336 and a demand generator 338. The truncator 336, in one embodiment, is responsible for ejecting blocks and creating ABSENT placeholders in the sparse volume (here, the file system 310) in order to reclaim useful storage space on the sparse volume. This operation may be referred to as cache ejection. The demand generator 338, also an optional component, is responsible for proactively pulling blocks from a remote volume (e.g., a remote volume at the origin server 130), e.g., to restore or migrate data from the remote volume.

Where a file system tolerates absent blocks (e.g., a sparse volume), in order to ensure that remote read requests are serviced with correct data, the operating system 310 utilizes a request coalescing component 330. The request coalescing component 330 coalesces redundant remote read requests and also serves as a synchronization point between the file system 310 and the remote volumes. The storage operating system 300 maintains all outstanding remote requests in an outstanding requests buffer 332. When a client read request requires remote access to data, the request coalescing component 330 parses the list of outstanding remote requests stored in the outstanding requests buffer 332 to determine if there already exists an outstanding request for the same data. If so, the request coalescing component 330 cancels the redundant remote read request.

It will be understood to those skilled in the art that the inventive technique described herein may apply to any type of special-purpose (e.g., file server, caching server, or multi-protocol storage appliance) or general-purpose computer, including a standalone computer or portion thereof, embodied as or including a storage system 120. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

Figure 4:
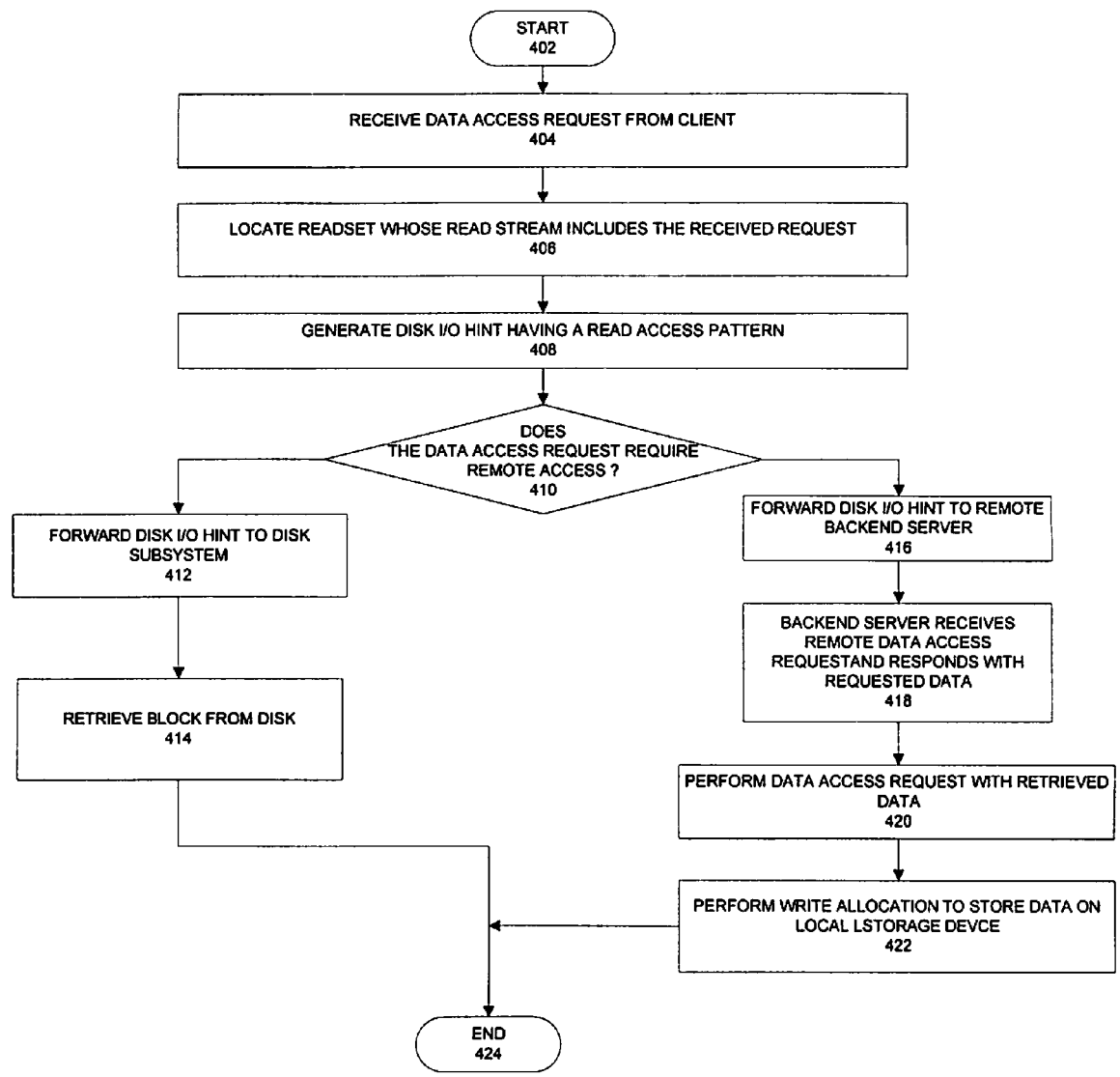
FIG. 4 is a flow chart illustrating a method to provide a unified read-ahead scheme for multiple sources, according to one embodiment of the present invention.

FIG. 4 is a flow chart illustrating a method to provide unified read-ahead scheme for multiple sources, according to one embodiment of the present invention. The method commences at operation 402. At operation 404, the storage operating system 300 receives a data access request from the client 110 and locates a readset whose stream includes the received request. The readahead engine 328 of the file system 310 generates an I/O "hint" at operation 408 for both local and remote requests. If it is determined, at operation 410, that the data access request is a local request, the method proceeds to operation 412, where the I/O "hint" is forwarded to a disk subsystem (e.g., RAID system 322), after which the requested block(s) are retrieved from disk at operation 414. If it is determined, at operation 410, that the data access request is a remote request, the method proceeds to operation 416, where the I/O "hint" is forwarded to the remote backend server (e.g., the origin server 130). The I/O "hint" includes, in one embodiment, an indication of the amount of readahead data to be retrieved. Such indication is generated based, in one embodiment, on one or more factors, such as historical information about prior requests associated with the target data container (here, the sparse volume associated with the file system 310). The backend server receives remote data access request and responds with the requested data at operation 418, after which a data access request is performed with the retrieved data at operation 420. The data is stored on the local storage device at operation 422. The method ends at operation 424. The method thus provides a unified readahead scheme for multiple sources, i.e., for both remote and local requests for data.

Sets of instructions to perform a method utilizing a unified readahead scheme for multiple sources may be stored on a machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention. The term "machine-readable medium" shall accordingly be taken to include, but not be limited to, solid-state memories, optical and magnetic media.

Thus, a method and system to provide a unified readahead scheme for multiple sources, according to one embodiment of the present invention, have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Remote Volume Protocol

In an illustrative embodiment, a storage operating system utilizes a remote volume protocol, hereinafter called the NetApp Remote Volume (NRV) protocol, to retrieve ABSENT blocks from a remote storage system configured to act as a backing store for a sparse volume. It should be noted that the NRV protocol may also be utilized to retrieve non-ABSENT blocks from the backing store. Thus, the NRV protocol may be utilized to retrieve data in a file system that utilizes holes as described above. The NRV protocol typically utilizes the TCP/IP protocol as a transport protocol and all NRV messages (both requests and responses) are prefixed with a framing header identifying the length of the NRV message in bytes (exclusive of this length of the initial length header itself).

Figure 5:
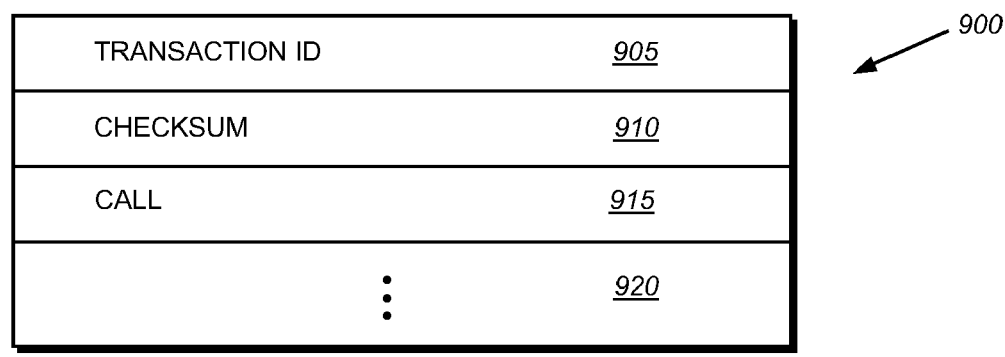
FIG. 5 is a schematic block diagram of a protocol header data structure in accordance with an embodiment of the present convention.

FIG. 5 is a schematic block diagram of an NRV protocol header data structure 601 in accordance with an embodiment of the present invention. The header data structure 601 includes a transaction identifier (ID) field 905, a checksum field 910, a call field 915 and, in alternate embodiments, additional fields 920. The transaction ID field 905 contains a unique transaction ID utilized by the protocol to pair requests and responses. Thus a NRV response from the backing store will identify which NRV request it is associated with by including the transaction ID of the request. The transaction ID is unique per request per connection. In the illustrative embodiment, the first transaction ID utilized per connection is a random value, which is thereafter incremented with each transaction. The checksum field 910 is utilized for storing checksum information to ensure that the response/request has not been corrupted.

Figure 6:
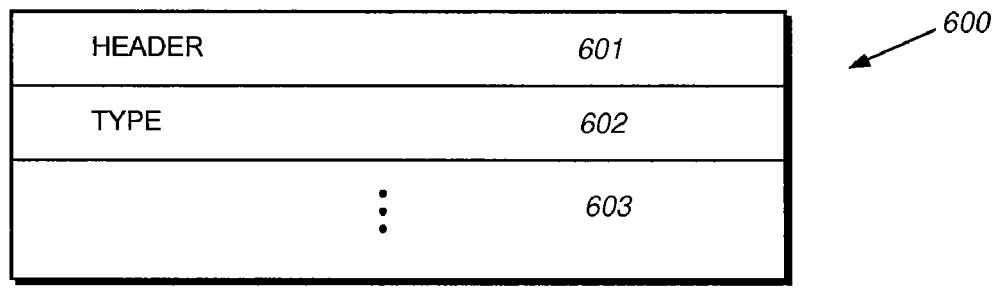
FIG. 6 is a schematic block diagram of a protocol request data structure in accordance with an embodiment of the present convention.

FIG. 6 is a schematic block diagram of an exemplary protocol request data structure 600 in accordance with embodiment of the present invention. The request data structure 600 includes protocol header 601, a type field 602 and, in alternate embodiments, additional fields 603. The type field 602 identifies one of the remote file system operations supported by the protocol. These types include, inter alia, INIT, VOLINFO, READ, LOCK_PCPI, UNLOCK_PCPI and AUTH, each of which is described in detail further below in reference to type-specific data structures. Each of these types of requests has a data structure associated therewith. The type-specific data structure is appended to the request data structure 600 when transmitted to the backing store.

Figure 7:
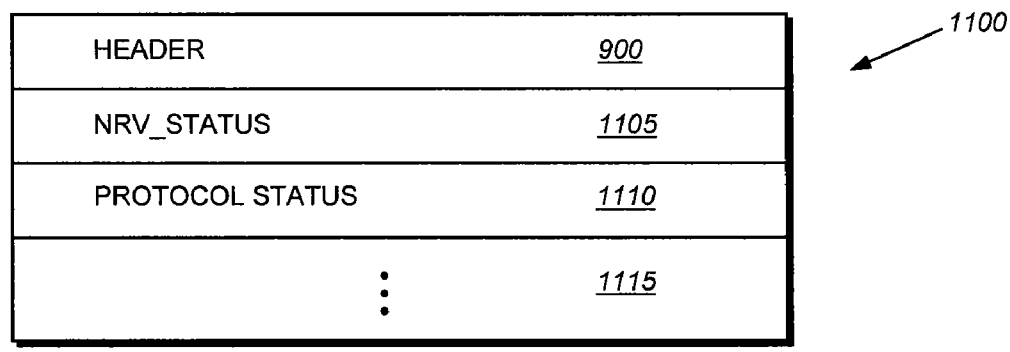
FIG. 7 is a schematic block diagram of a protocol response data structure in accordance with embodiment of present convention.

A response to the protocol request is in the format of a protocol response data structure 1100, which is illustratively shown as a schematic block diagram in FIG. 7. The response data structure 1100 includes header 601, a NRV_Status field 1105, a protocol status field 1110 and, in alternate embodiments, additional fields 1115. The NRV_Status field 1105 may include one of the protocol specific status indicators such as OK, NOINIT, VERSION, CANTSEND, LS, and FS_VERSION. It should be noted that in alternate embodiments, other and/or differing status indicators may be utilized. The OK status indicator signifies that the request was successful and that there is no error condition. The NOINIT indicator is sent in response to a request being transferred prior to beginning a session. In the illustrative embodiment, an INIT request, described further below, must be the first request in a session after any authentication (AUTH) requests. The VERSION indicator is utilized when there are mismatched versions of the NRV protocol, e.g., the storage system and backing store are utilizing incompatible versions of the NRV protocol. The CANTSEND indicator indicates a failure of the underlying transport protocol in transmitting a particular request or response. The LS status indicator is used by the backing store to indicate that a persistent consistency point image (PCPI) was not able to be locked in response to a LOCK_PCPI request, described further below.

The FS_VERSION indicator means that the storage system and the backing store are utilizing incompatible versions of a file system so that data may not be retrieved from the backing store.

The protocol status field 1110 includes a file system error value. Thus, the protocol status field 1110 may be utilized to transfer a WAFL file system or other file system error value between the backing store and the storage appliance. Each of the NRV protocol operations that includes a response data structure includes a type-specific data structure that is appended to the end of a protocol response data structure 1100.

Figure 8:
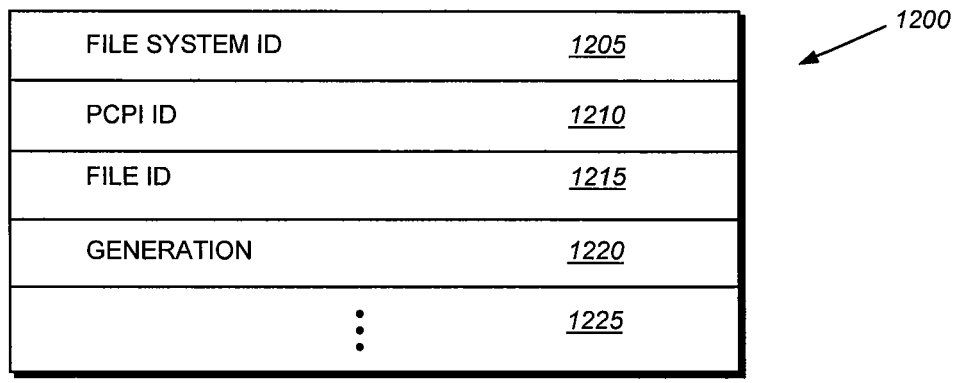
FIG. 8 is a schematic block diagram of a file handle data structure in accordance with an embodiment of the present convention.

Many NRV protocol requests and/or responses include a file handle identifying a file to which an operation is directed. FIG. 8 is a schematic block diagram of a file handle data structure 1200 in accordance with an embodiment of the present invention. The file handle data structure 1200 includes a file system ID field 1205, a PCPI ID field 1210, a file ID field 1215, a generation field 1220 and, in alternate embodiments, additional fields 1225. The file system ID field 1205 identifies the particular file system containing the file of interest. This may be a particular virtual volume or physical volume associated with the backing store. This field 1205 typically contains the fsid of the desired volume. The PCPI ID field 1210 identifies the appropriate PCPI associated with the file. Thus, the NRV protocol permits access to a file stored within a particular PCPI. File ID field 1215 identifies the unique file ID associated with the file. The generation field 1220 contains a value identifying a particular generation of the inode associated with the file.

Figure 9:
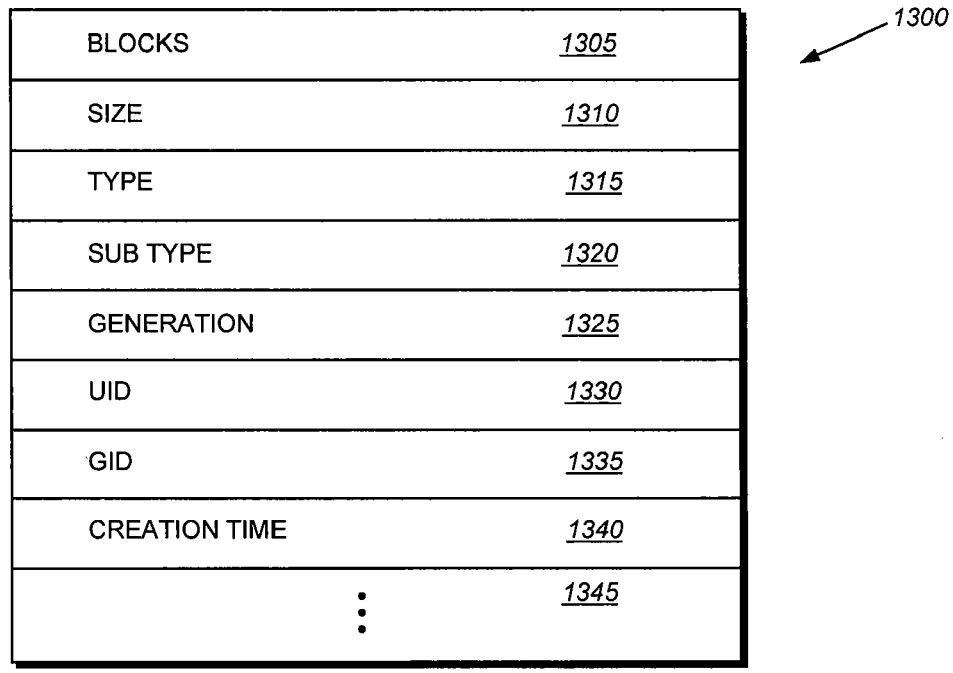
FIG. 9 is a schematic block diagram of a file attribute data structure in accordance with an embodiment of the present convention.
Figure 10:
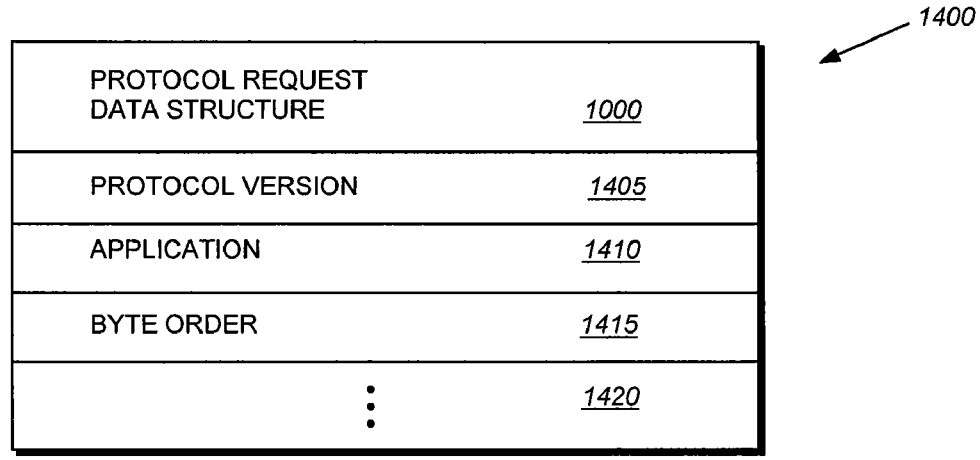
FIG. 10 is a schematic block diagram of an initialization (INIT) request data structure in accordance with embodiment of the present convention.

Additionally, many NRV requests and responses contain a set of file attributes that are contained within an exemplary file attribute data structure 1300 as shown in a schematic block diagram of FIG. 9. The file attribute data structure 1300 includes a blocks field 1305, a size field 1310, a type field 1315, a subtype field 1320, a generation field 1325, a user identifier (UID) field 1330, a group identifier field (GID) 1335, a creation time field 1340 and, in alternate embodiments, additional fields 1345. The blocks field 1305 identifies the number of blocks utilized by the file. The size field 1310 contains the size of the file in bytes. The type and subtype fields 1315, 1320 identify the type and, if necessary, a subtype of the file. The generation field 1325 identifies the current generation number associated with the inode of the file. The UID field 1330 identifies the owner of the file, whereas the GID field 1335 identifies the current group that is associated with the file.

In accordance with the illustrative embodiment of the protocol, the first request sent over a connection, after any authentication requests described further below, is an initialization request. This initialization request (i.e. an INIT type of type field 602) comprises an initialization data structure 1400, which is exemplary shown as a schematic block diagram in FIG. 10. The initialization data structure 1400 includes a protocol request data structure 600, a protocol version field 1405, an application field 1410, a byte order field 1415 and, in alternate embodiments, additional fields 1420. The request data structure 600 is described above in reference to FIG. 6. The protocol version field 1405 contains a protocol "minor" version in use at the client (storage appliance initiating the connection) that identifies clients utilizing different versions of the protocol. The application field 1410 identifies the application utilizing the NRV protocol; such applications may include restore on demand (ROD) or proxy file system (PFS). The byte order field 1415 identifies the client's native byte order, e.g., big or little endian.

Figure 11:
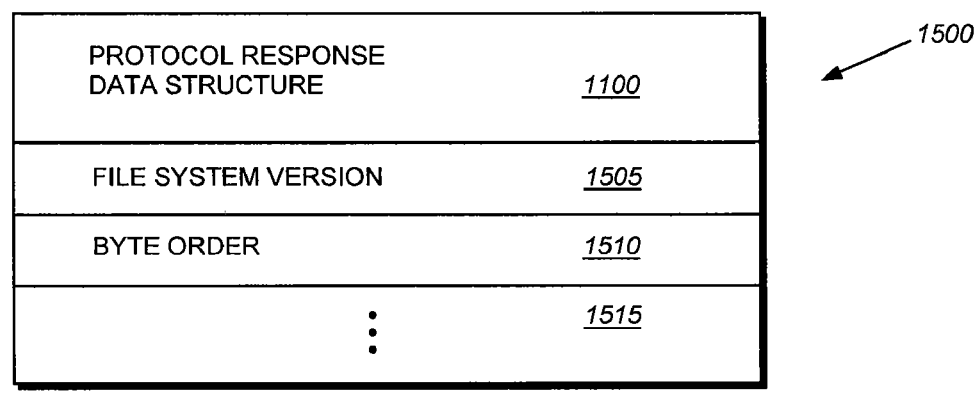
FIG. 11 is a schematic block diagram of an initialization (INIT) response data structure in accordance with embodiment of the present convention.

In response to the initialization request data structure 1400, the backing store transmits an initialization response data structure 1500, which is illustratively shown in a schematic block diagram of FIG. 11. The initialization response data structure 1500 includes a protocol response data structure 1100, a file system version field 1505, a byte order field 1510 and, in alternate embodiments, additional fields 1515. The response data structure 1100 is described above in reference to FIG. 7. The file system version field 1505 identifies the maximum file system version supported by the backing store. The byte order field 1510 identifies the backing store's native byte order. In the protocol specification, if the storage system's and backing store's byte orders differ, all future communication occurs using the backing store's of byte order as defined in field 1510.

Figure 12:
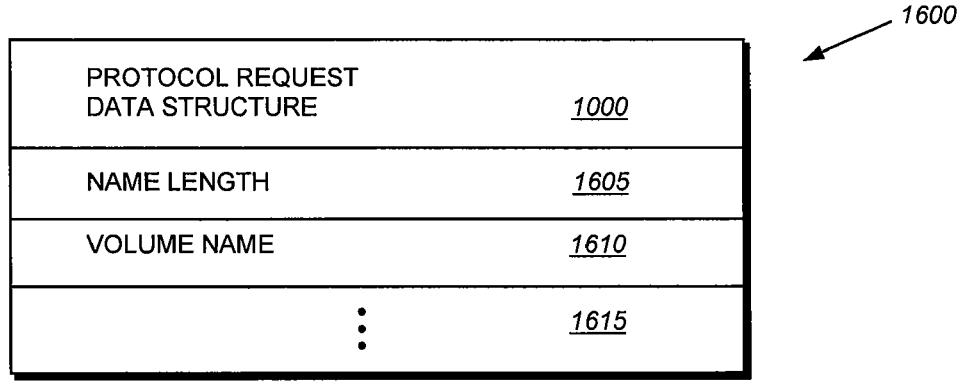
FIG. 12 is a schematic block diagram of a volume information (VOLINFO) request data structure in accordance with embodiment of the present convention.

To retrieve information pertaining to a particular volume, the storage appliance may transmit a volume information (VOLINFO) request data structure 1600, which is shown as a schematic block diagram of FIG. 12. The volume information data structure 1600 includes a protocol request data structure 600, a name length field 1605, a volume name field at 1610 and, in alternate embodiments, additional fields 1615. The name length field 1605 identifies length of the volume name field while the volume name field 1610 comprises a text string of the volume name. The VOLINFO request is utilized to obtain volume information, which may be used to, e.g., ensure that a volume on the storage system is sufficiently sized to accommodate all data located on a volume on the backing store.

Figure 13:
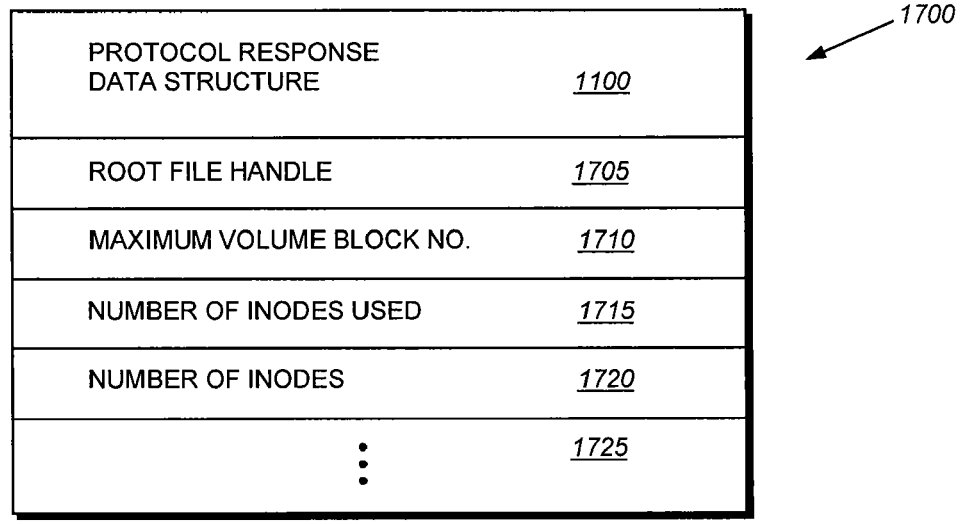
FIG. 13 is a schematic block diagram of a volume information (VOLINFO) response data structure in accordance with embodiment of the present convention.

In response to a volume information request, the backing store will issue a volume information response data structure 1700, of which an exemplary schematic block diagram is shown in FIG. 13. The volume information response data structure 1700 comprises a protocol response data structure 1100, a root file handle field 1705, a maximum volume block number field 1710, a number of inodes used field 1715, a number of inodes field 1720 and, in alternate embodiments, additional fields 1725. The root file handle field 1705 contains a conventional file handle for the root directory of the specified volume. The maximum volume block number field 1710 is set to the greatest allowable volume block number in the file system of the specified volume. The value of this field plus one is the size of the volume in blocks as, in the illustrative embodiment, volume block numbers begin with vbn 0. Thus, in the illustrative embodiment of the WAFL file system, which utilizes 4 KB blocks, the value of this field plus one is the size of the volume in 4 KB blocks. The number of inodes used field 1715 contains number of inodes in use in the active file system of the specified volume, whereas the number of inodes field 1720 holds the total number of allocable inodes in the active file system of the specified volume.

Figure 14:
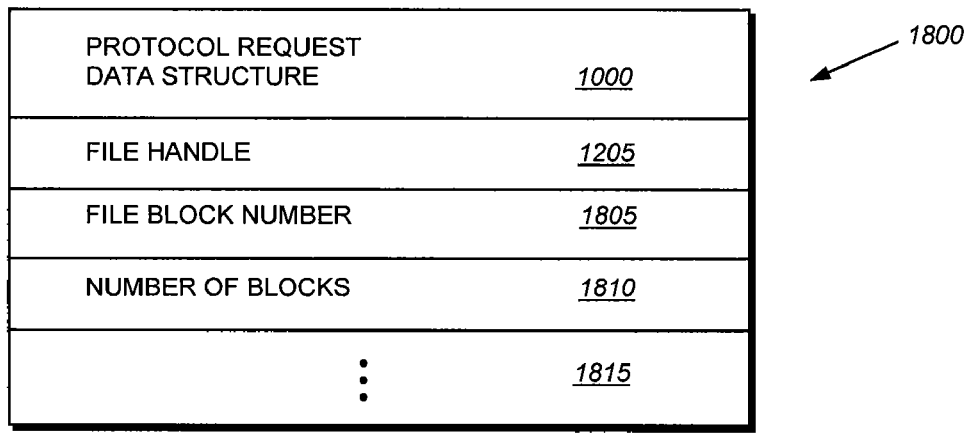
FIG. 14 is a schematic block diagram of a read (READ) request data structure in accordance with embodiment of the present convention.

FIG. 14 is a schematic block diagram of an exemplary read (i.e.; a READ type of field 602) request 1800 in accordance with an embodiment of the present intention. The read request data structure 1800 includes protocol request data structure 600, file handle 1200, a file block number field 1805, a number of blocks field 1810 and, in alternate embodiments, additional fields 1815. The request data structure 600 is described above in reference to FIG. 15, whereas the file handle data structure 1200 is described above in reference to FIG. 8. The file block number field 1805 identifies the first file block to be read. The file block number represents an offset of 4 KB blocks into the file. In alternate embodiments, where the file system utilizes differing sizes for file blocks, the file block number is the offset in the appropriate block size into the file. The number of blocks field 1810 identifies the number of file blocks to be read.

Figure 15:
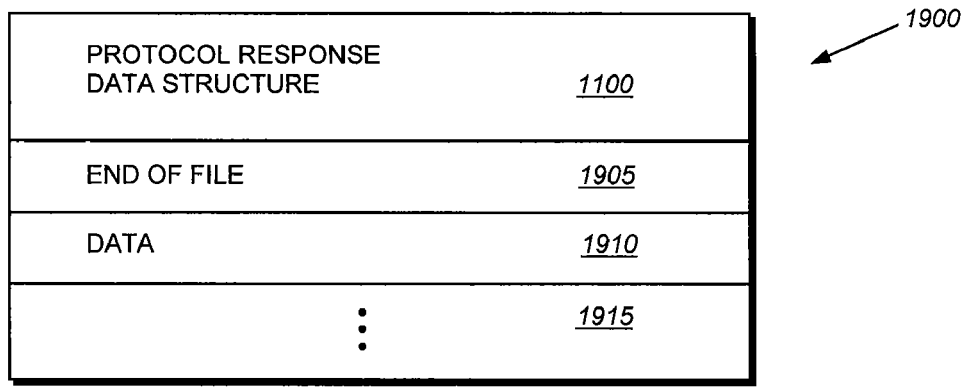
FIG. 15 is a schematic block diagram of a read (READ) response data structure in accordance with embodiment of the present convention.

A read request response data structure 1900 is illustratively shown in FIG. 15. The read response data structure 1900 includes response data structure 1100, an end of file field 1905, a data field 1910 and, in alternate embodiments, additional fields 1915. The response structure 1100 is described above in reference to FIG. 7. The end of file field 1905 identifies whether there is additional data to be read from the file and, if not, its content may be set to a FALSE value. Alternatively, the field 1905 may be set to a TRUE value if the end of the file has been reached by the requested read operation. The data field 1910 is a variable number of bytes of data from the file, starting at the requested file block number.

Another type of remote file system operation supported by the NRV protocol is the lock PCPI operation (i.e., a LOCK_PCPI type field 602) that is used to prevent a PCPI from being deleted on the backing store. The Lock PCPI operation is typically utilized when the PCPI is necessary for a "long-lived" application, such as restore on demand. In the illustrative embodiment, the locked PCPI command is an inherently stateful request that instructs the backing store to prevent deletion of the PCPI until either the client disconnects or unlocks the PCPI (the latter with the unlocked PCPI command described further below). An exemplary LOCK_PCPI request data structure 2000 is illustratively shown as a schematic block diagram in FIG. 16. The LOCK_PCPI request data structure 2000 includes a request data structure, a file system ID field 2005, a lock default PCPI field 2010, a checked PCPI configuration field 2015, a PCPI name length field 2020, a PCPI information field 2100, a PCPI name field 2030 and, in alternate embodiments, additional fields 2035. The request data structure 600 is described above in conjunction with FIG. 6. The file system ID field 2005 identifies the volume containing the PCPI to be locked. The lock default PCPI field 2010 may be set to a value of TRUE or FALSE. If it is set to TRUE, then the backing store locks the default PCPI for the volume identified and ignores the name and information fields 2030, 2100. If the value if FALSE then the values of these fields 2030, 2100 are utilized in identifying the PCPI. In certain embodiments, the backing store may be configured to have a default PCPI for use in serving NRV protocols. This default PCPI may be selected by the use of the lock default PCPI field 2010. The check PCPI configuration field 2015 may also be set to a value of TRUE or FALSE. If TRUE then the server verifies that the specified volume is an acceptable secondary volume for use in a sparse volume application. The PCPI name length field 2020 is set to the length of the PCPI name field, which holds a string comprising the name of the PCPI to be locked.

The PCPI information field 2100 comprises a PCPI information data structure 2100 illustratively shown as a schematic block diagram of FIG. 17. The PCPI information data structure 2100 includes an identifier field 2105, a consistency point count field 2110, a PCPI creation time field 2115, a PCPI creation time in microseconds field 2120 and, in alternate embodiments additional fields 2125. The identifier field 2105 is a PCPI identifier that uniquely identifies a particular PCPI. The consistency point count field 2110 identifies a particular CP count associated with the PCPI. Illustratively, at each CP, the CP count is incremented, thereby providing a unique label for the PCPI created at that point in time. Similarly, the PCPI creation time fields 2115, 2120 are utilized to uniquely identify the particular PCPI by identifying its creation time in seconds and microseconds, respectively.

In response the server sends a lock_PCPI response data structure 2200, of which a schematic block diagram of which s shown in FIG. 18. The lock PCPI response data structure 2200 includes a response data structure 1100, PCPI information data structure 2100, a blocks used field 2210, a blocks_holes field 2215, a blocks_overwrite field 2220, a blocks_holes_CIFS field 2225, an inodes used field 2230, a total number of inodes field 2235 and, in alternate embodiments, additional fields 2240. The response data structure 1100 is described above in reference to FIG. 7. The PCPI information data structure 2100 is described above in reference to FIG. 17. The blocks used field 2210 contains a value identifying the number of blocks that are utilized by the PCPI on the backing store. The blocks_holes field 2215 identifies the number of blocks in the PCPI that are reserved for holes within the PCPI. The blocks_overwrite field 2220 contains a value identifying the number of blocks that are reserved for overwriting in the PCPI. The inodes field 2230 contains a value identifying the number of inodes used in the PCPI and the total number of inodes field 2235 contains a value identifying the total number of allocable inodes in the PCPI.

Once a client no longer requires a PCPI to be locked, it may issue an unlock PCPI command (of type UNLOCK_PCPI in field 602) to the backing store. The client issues such a command by sending an unlock PCPI request data structure 2300 as illustratively shown in FIG. 19. The unlock PCPI command data structure 2300 includes a request data structure 600, a file system ID field 2305, a PCPI ID field 2310 and, in alternate embodiments additional fields 2315. The requested data structure 600 is described above in conjunction with FIG. 6. The file system identifier field 2305 identifies the volume containing the PCPI to the unlocked. The PCPI identifier field 2310 identifies the PCPI previously locked using LOCK_PCPI request. In accordance with the protocol, the server must unlocked the PCPI prior to responding to this command. The response to an unlock PCPI request is illustratively a zero length message body.

Figure 20:
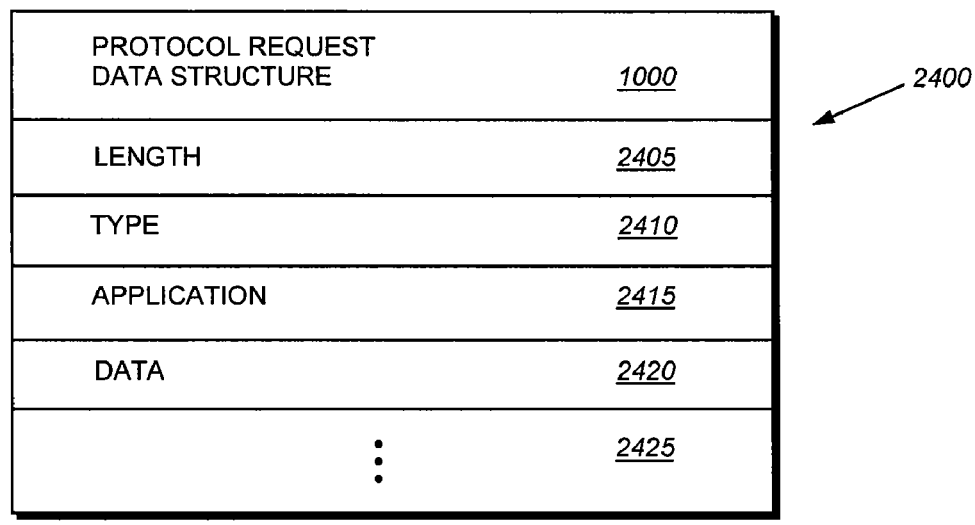
FIG. 20 is a schematic block diagram of an authentication (AUTH) request data structure in accordance with embodiment of the present convention.

As noted above, the first request issued over a protocol connection is a series of authentication requests (i.e., a AUTH type of field 602). The authentication request is utilized for NRV session authentication and, in the illustrative embodiment, is preferably the first request issued over an NRV connection. The backing store and storage appliance may negotiate with any number of authentication request/response pairs. An illustrative schematic block diagram of an authentication request data structure 2400 is shown in FIG. 20. The AUTH request data structure 2400 includes a request data structure 600, a length field 2405, a type field 2410, an application field 2415, a data field 2420 and, in alternate embodiments, additional fields 2425. The requested data structure 600 is described above in conjunction with FIG. 6. The length field 2405 identifies the number of bytes contained within the data field 2420. Type field 2410 identifies a type of authentication to be utilized. The application field 2415 identifies one of a plurality of applications that utilizes the protocol. The application utilizing the protocol is identified so that, for example, the backing store may impose higher or lower authentication and standards depending on the type of application utilizing the protocol. The data field 2420 contains authentication data.

Figure 21:
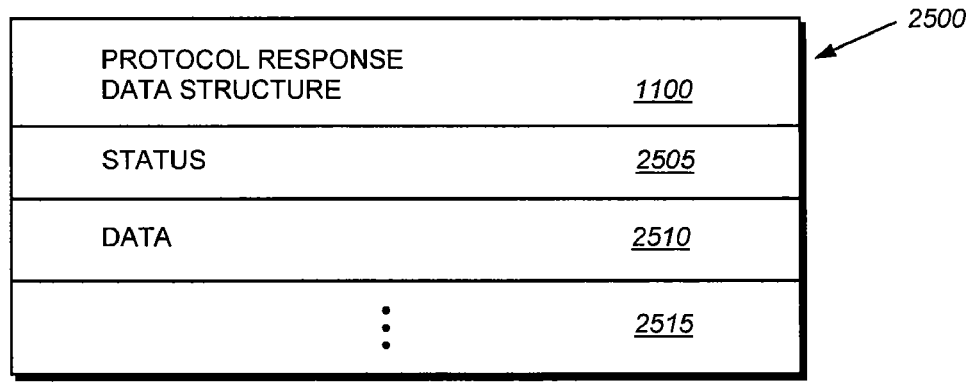
FIG. 21 is a schematic block diagram of an authentication (AUTH) response data structure in accordance with an embodiment of the present convention.

In response, the backing store sends an authentication response data structure 2500 as shown in FIG. 21. The authentication response data structure 2500 includes response data structure 1100, a status field 2505, a data field 2510 and, in alternate embodiments, additional fields 2515. The response data structure 1100 is described above in reference to FIG. 7. The status field 2505 identifies the current status of the authentication e.g., OK, signifying that authentication is complete, or NEED_AUTHENTICATION, signifying that the backing store requests that the storage system transmit a higher level of authentication. The status field 2505 may also hold a value of CONTINUE, which may be utilized if multiple exchanges are required to authenticate the session. The data field 2510 contains the authentication response data.

Figure 22:
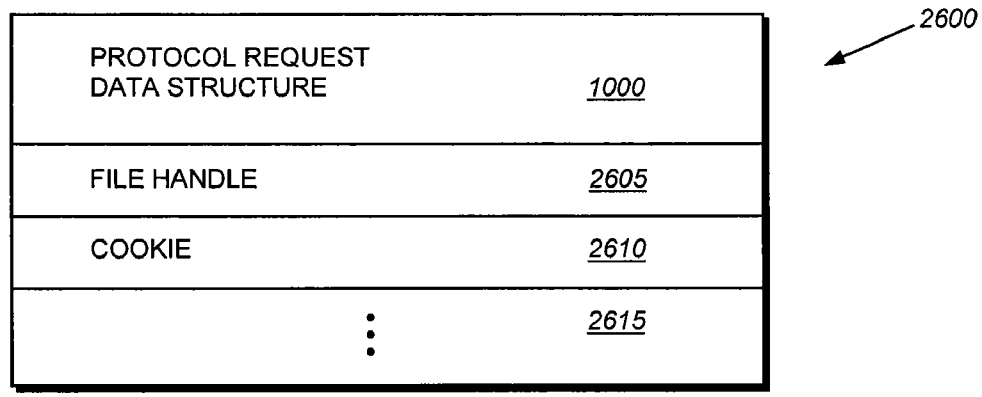
FIG. 22 is a schematic block diagram of a get holy bitmap (GET_HOLY_BITMAP) request data structure in accordance with an embodiment of the present invention.

The NRV protocol also supports a get holy bitmap function (i.e., a GET_HOLY_BITMAP type of field 602) that identifies which, if any, blocks on a backing store are not present, e.g., either absent or a hole. FIG. 22 is a schematic block diagram of an exemplary GET_HOLY_BITMAP request data structure 2600 in accordance with an embodiment of the present invention. The request 2600 includes a protocol request data structure 600, a file handle 2605, a cookie value 2610 and, in alternate embodiments, additional field 2615. The protocol request data structure 600 is described above in reference to FIG. 6. The file handle field 2605 contains a protocol file handle that identifies the file system ID, snapshot ID and file ID of the file for which the bitmap is to be obtained. The cookie field 2610 contains one of two values. The first value is a predetermined value utilized for an initial request. The second value is the value of the last cookie value received from the backing store to be utilized for continued retrieval of bitmaps.

Figure 23:
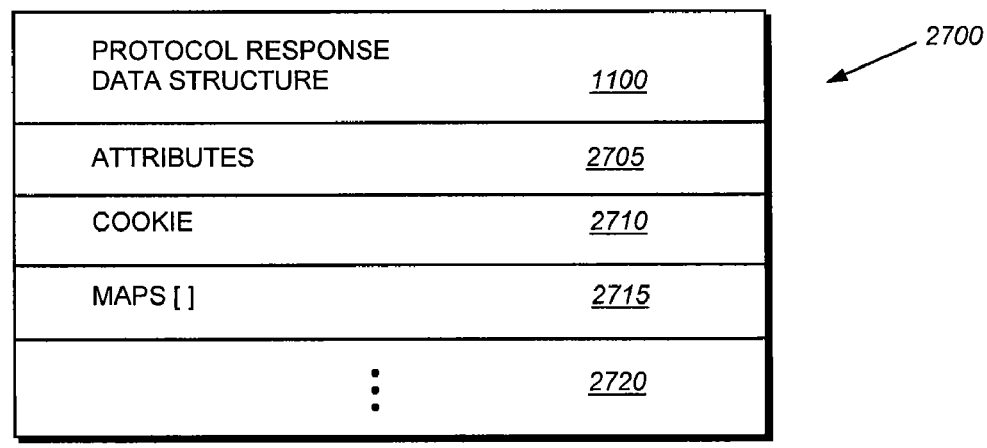
FIG. 23 is a schematic block diagram of a get holy bitmap (GET_HOLY_BITMAP) response data structure in accordance with an embodiment of the present invention.

FIG. 23 is a schematic block diagram of an exemplary GET_HOLY_BITMAP response data structure 2700 in accordance with an embodiment of the present invention. The response data structure 2700 includes a protocol response data structure 1100, and attributes field 2705, a cookie field 2710, an array of maps 2715 and, in alternate embodiments, additional fields 2720. The protocol response data structure 1100 is described above in reference to FIG. 7. The attributes of field 2705 contains the most up to date file attributes of the identified file at the time the GET_HOLY_BITMAP request is processed. The cookie field 2710 contains a cookie that is of one of two values. The first value is a predefined value utilized for the final response. The second value is a new cookie value to be utilized by the storage system for continued retrieval operations. The maps array 2715 it is a variable length array of indirect block map structures 2800.

Figure 24:
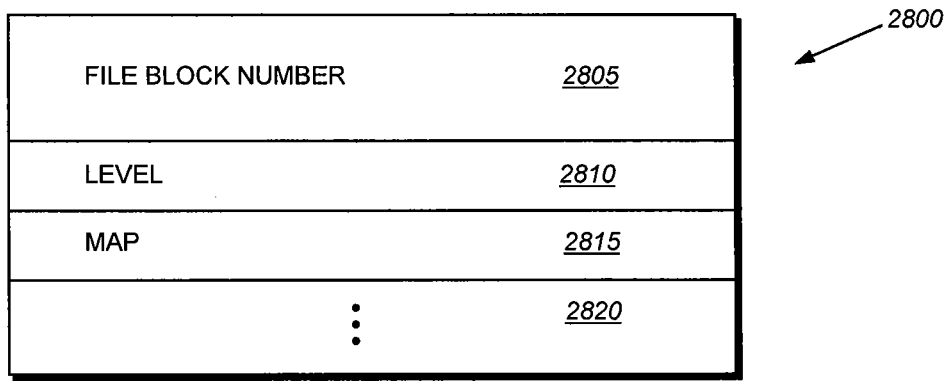
FIG. 24 is a schematic block diagram of a indirect block map structure in accordance with an embodiment of the present invention.

FIG. 24 is a schematic block diagram of an exemplary indirect block map structure 2800. The indirect block map structure 2800 comprises of a file block number field to a 2805, a level field 2810, a map field 2815, and, in alternate embodiments, additional fields 2820. The file block number field 2805 in conjunction with the level field 2810 identifies an indirect block in a buffer tree of the specified file. The map field 2815 is a bitmap wherein every bit that is set in the bitmap represents a missing block (absent or hole) at the index in the indirect block. That is, for any block that is missing (absent or a hole) in the identified indirect block, a bit will be set. In the illustrative embodiment, the response from the request is utilized to ensure that appropriate space reservations are made when first accessing a file.

Pre/Post Operation Attributes

Network file system protocols typically provide information within the protocol so that clients may cache data to provide an accurate and consistent view of the file system. For example, in the Network File System (NFS) Version 2, file attributes are sometimes returned along with operations, thereby permitting clients to cache data as long as the attributes have not been modified. This was further improved in version 3 of NFS where many operations that modify the file system return attributes from before the operation as well as after the operation. This feature allows a client to recognize if its cached content was up-to-date before the operation was executed. If the cache content was accurate, the client may update its cache by doing the update locally without invalidate its own cached content. This technique is known as pre/post operation attributes.

Most file systems cache content based on a file's unique file handle. While most network operations in protocols that modify the file system have the necessary file handle in attributes allow the client to correctly update its cache, there are some operations that do not include sufficient information. These operations typically reference files using a directory file handle and a file name, which results in the client receiving a response from which it cannot determine which file was referenced and potentially modified. As a client cannot determine which file was referenced and/or modified, it is unable to ensure that its cache is consistent with the state of the file system. One advantage of the present invention is that the NRV protocol provides sufficient information to permit proper caching of any object modified on the origin server using any of these operations.

Figure 25:
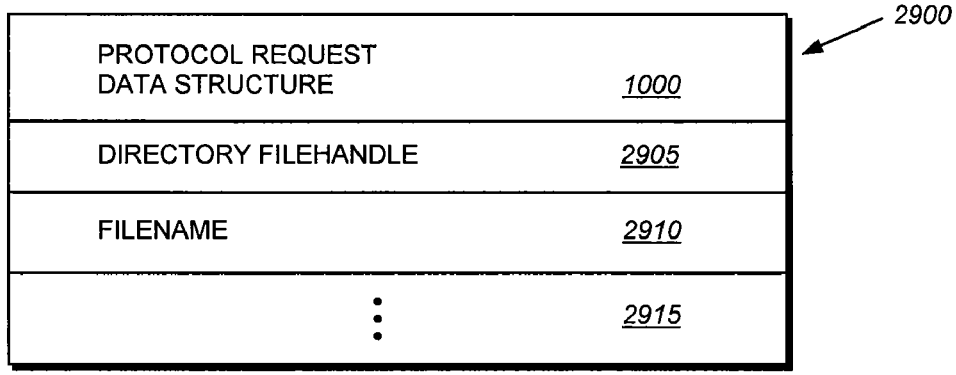
FIG. 25 is a schematic block diagram of a remove (REMOVE) request data structure in accordance with an embodiment of the present invention.
Figure 26:
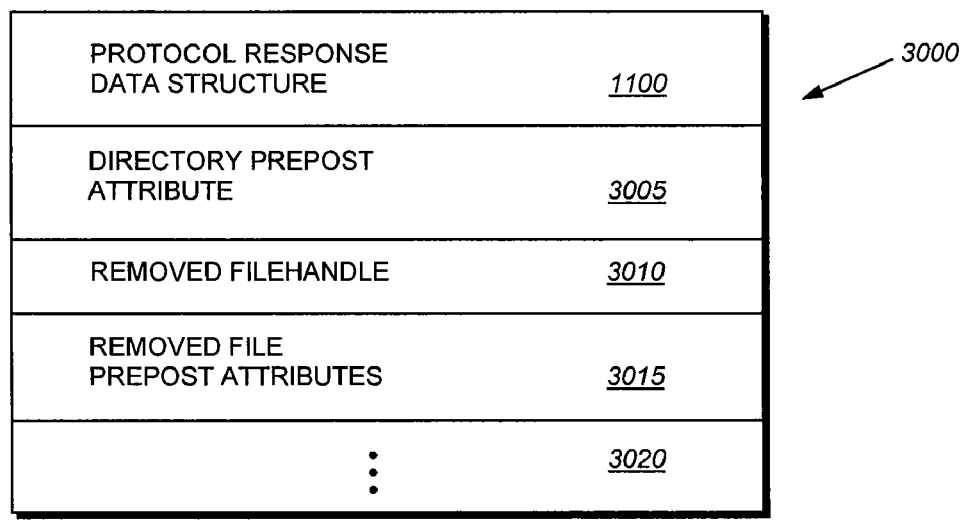
FIG. 26 is a schematic block diagram of a remove (REMOVE) response data structure in accordance with an embodiment of the present invention.

FIG. 25 is a schematic block diagram of a remove request data structure 2900 (i.e., a REMOVE type of field 602) in accordance with an embodiment of the present invention. The remove request data structure 2900 includes a protocol request data structure 600, a directory file handle field 2905, a filename field 2910 and, in alternate embodiments, additional fields 2915. The request data structure 600 is described above in reference to FIG. 6. The directory file handle field 2905 comprises a file handle associated with a particular directory within the file system. The filename field 2910 contains the filename of the file to be removed.

Figure 27:
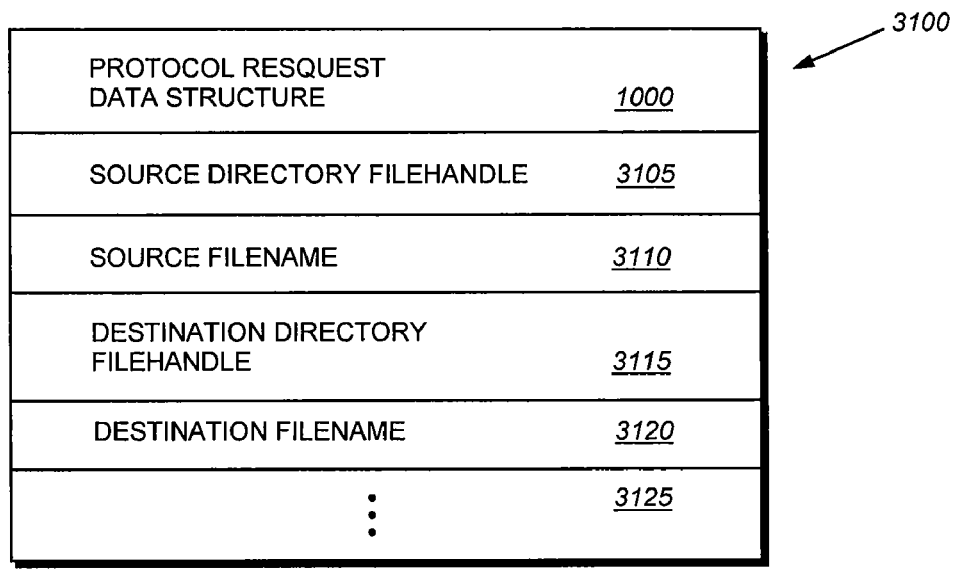
FIG. 27 is a schematic block diagram of a rename (RENAME) request data structure in accordance with an embodiment of the present invention.

A remove response data structure 3000 is illustratively shown in FIG. 27. The remove response data structure 3000 illustratively includes a protocol response data structure 1100, a directory pre/post attributes field 3005, a removed file handle field 3010, a removed file pre/post attributes field 3015 and, in alternate embodiments, additional fields 3020. The protocol response data structure 1100 is described above in reference to FIG. 7. The directory pre/post attributes field 3005 contains the attributes for the directory both before and after the removal. These attributes permit clients to properly maintain their caches. The removed file handle field 3010 contains the file handle for the file that was removed while processing the remove operation. The removed file pre/post attributes contains the attributes for the file prior to and following the removal operation.

FIG. 27 is a schematic block diagram of an exemplary rename request 3100 (i.e., a RENAME type of field 602) in accordance with an embodiment of the present invention. The rename request data structure 3100 includes a protocol request data structure 600, a source directory file handle 3105, a source file name field 3110, a destination directory file handle field 3115, a destination file name field 3120, and in alternate embodiments additional fields 3125. The protocol request data structure 600 is described above in reference to FIG. 6. The source directory file handle field 3105 contains the file handle identifying the source directory of the file to be renamed. The source filename field 3110 contains the filename of a file within the source directory identified by the source directory file handle field 31051. The destination directory file handle field 3115 contains a file handle for the directory to which she file is to be renamed. The destination file name field 3120 contains the filename of the resulting file.

Figure 28:
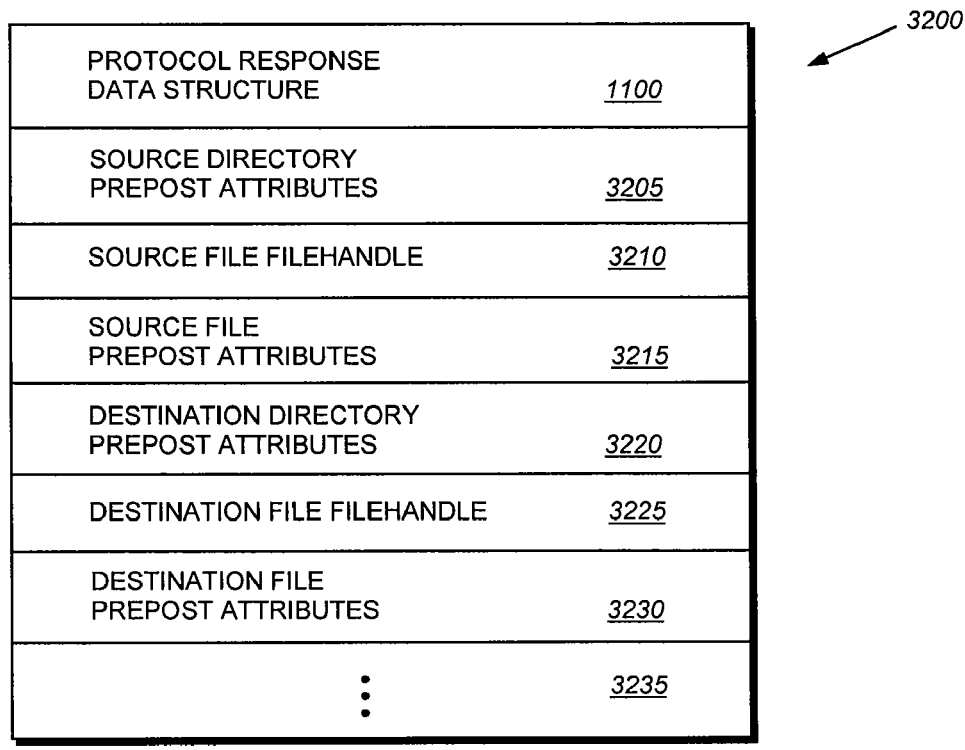
FIG. 28 is a schematic block diagram of a rename (RENAME) response data structure in accordance with an embodiment of the present invention.

FIG. 28 is a schematic block diagram of an exemplary of a rename response data structure 3200 in accordance with an embodiment of the present invention. The rename response data structure 3200 includes a protocol response data structure 1100, a source directory pre-post attributes field 3205, a source file handle field 3210, a source file pre/post attributes field 3215, a destination directory pre/post attributes field 3220, a destination file handle field 3225, a destination file pre/post attributes field 3230 and, in alternate embodiments additional fields 3235. The protocol response data structure 1100 is described above in reference to FIG. 7. The source directory pre/post attributes field 3205 contains the attributes for the source directory before and after the rename operation. The source file handle field 3210 contains a file handle associated with the file prior to the rename operation. The source file pre/post attributes field 3215 contains the attributes associated with the file prior to and immediately following the rename operation. The destination directory pre/post attributes field contains the attributes associated with the directory of the directory in which the file is being renamed. The destination file handle field 3225 contains the file handle for the newly renamed file, while the destination file pre-/post attributes field 3230 contains the file attributes for the destination file both before and after the rename operation.

Figure 29:
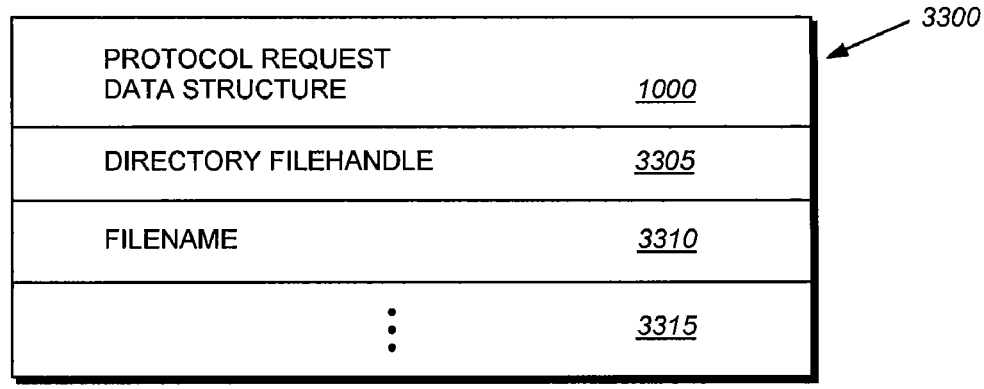
FIG. 29 is a schematic block diagram of a create (CREATE) request data structure in accordance with an embodiment of the present invention.

FIG. 29 is a schematic block diagram of an exemplary create request 3300 in accordance with an embodiment of the present invention. The create request data structure 3300 includes a protocol request data structure 600, a directory file handle field 3305, a file name field 3310 and, in alternate embodiments additional fields 3315. The protocol request data structure 600 is described above in reference to FIG. 6. The directory file handle field 3305 contains a file handle identifying the directory in which the file is to be created. The filename field 3310 identifies the name to be utilized for the creation of the file.

Figure 30:
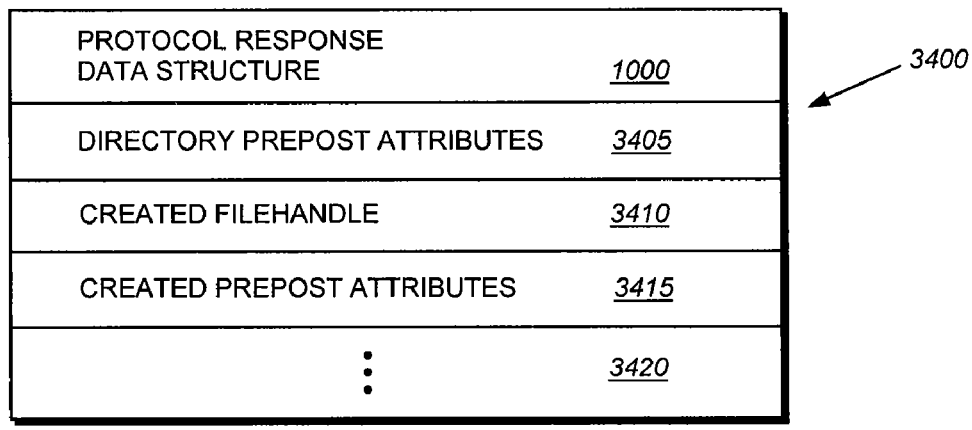
FIG. 30 is a schematic block diagram of a create (CREATE) response data structure in accordance with an embodiment of the present invention.

FIG. 30 is a schematic block diagram of a create response data structure 3400 in accordance with an embodiment of the present invention. The create response data structure 3400 includes a protocol response data structure 1100, a directory pre/post attributes field 3405, a created file handle field 3410, a created pre/post attributes field 3415 and, in alternate embodiments, additional fields 3420. The protocol response data structure 1100 is described above in relation to FIG. 7. The directory pre/post attributes field 3405 contains the attributes for the directory containing the newly created file both before and after the creation of the file. The created file handle field 3410 contains the file handle for the newly created file. The created file pre/post attributes field 3415 contains the attributes for the file prior to and following the file creation.

Retrieval of Data Using the NRV Protocol

Figure 31:
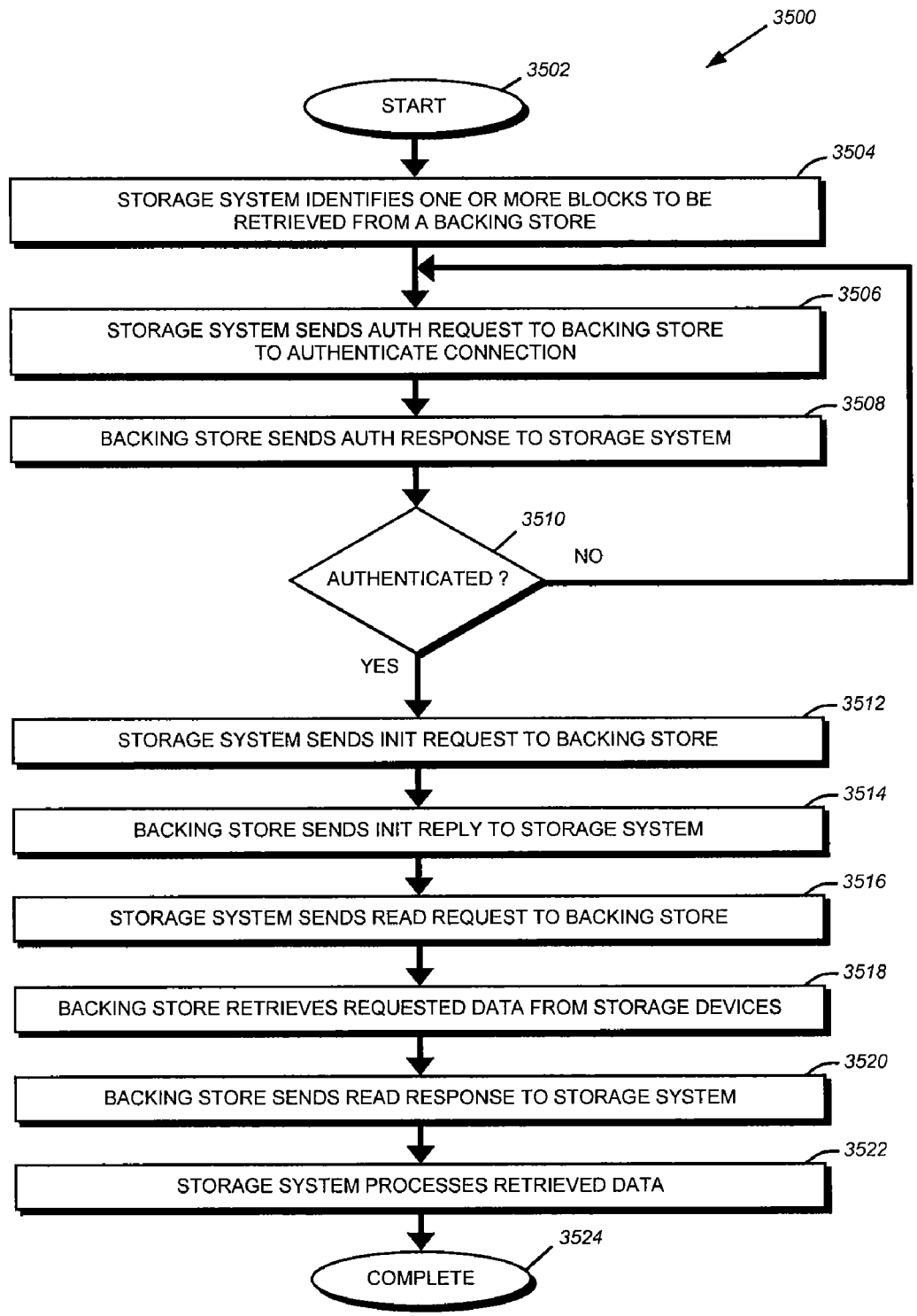
FIG. 31 is a flow chart detailing the steps of a procedure for retrieving one or more blocks from a backing store utilizing the NRV protocol in accordance with an embodiment of the present convention.

FIG. 31 is a flow chart detailing the steps of a procedure 3500 for retrieving one or more blocks from a backing store utilizing the NRV protocol in accordance with an embodiment of the present invention. The procedure begins in step 3502 and continues to step 3504 where a storage appliance identifies one or more blocks to be retrieved from a backing store. This identification may be made by determining that the blocks are marked ABSENT, as in the case of a sparse volume, or may be determined by other, alternate means. In response, the storage system sends an AUTH request to the backing store to authenticate the connection in step 3506.

The backing store responds with an AUTH response in step 3508 and in step 3510, a the storage system determines whether the connection has been authenticated. If it has not been authenticated, the procedure branches back to step 3506 and the storage appliance sends another AUTH request to the backing store. However, if the connection has been authenticated in step 3510, the procedure continues to step 3512 where the storage appliance sends an INIT request to the backing store. In response, the backing store sends an INIT reply to the storage appliance in step 3514. At this point, the protocol connection between the storage appliance and backing store has been initialized and authenticated, thereby enabling issuance of additional commands including, for example a VOLINFO command.

In this illustrated example, the storage appliance sends a READ request to the backing store in step 3516. In response the backing store retrieves the requested data from its storage devices in step 3518 by, for example, retrieving the data from disk. The backing store then sends a READ response including the requested data to the storage to appliance in step 3520. Upon receiving the requested data, the storage appliance processes the retrieved data in step 3522. The process then completes in step 3524.

Figure 32:
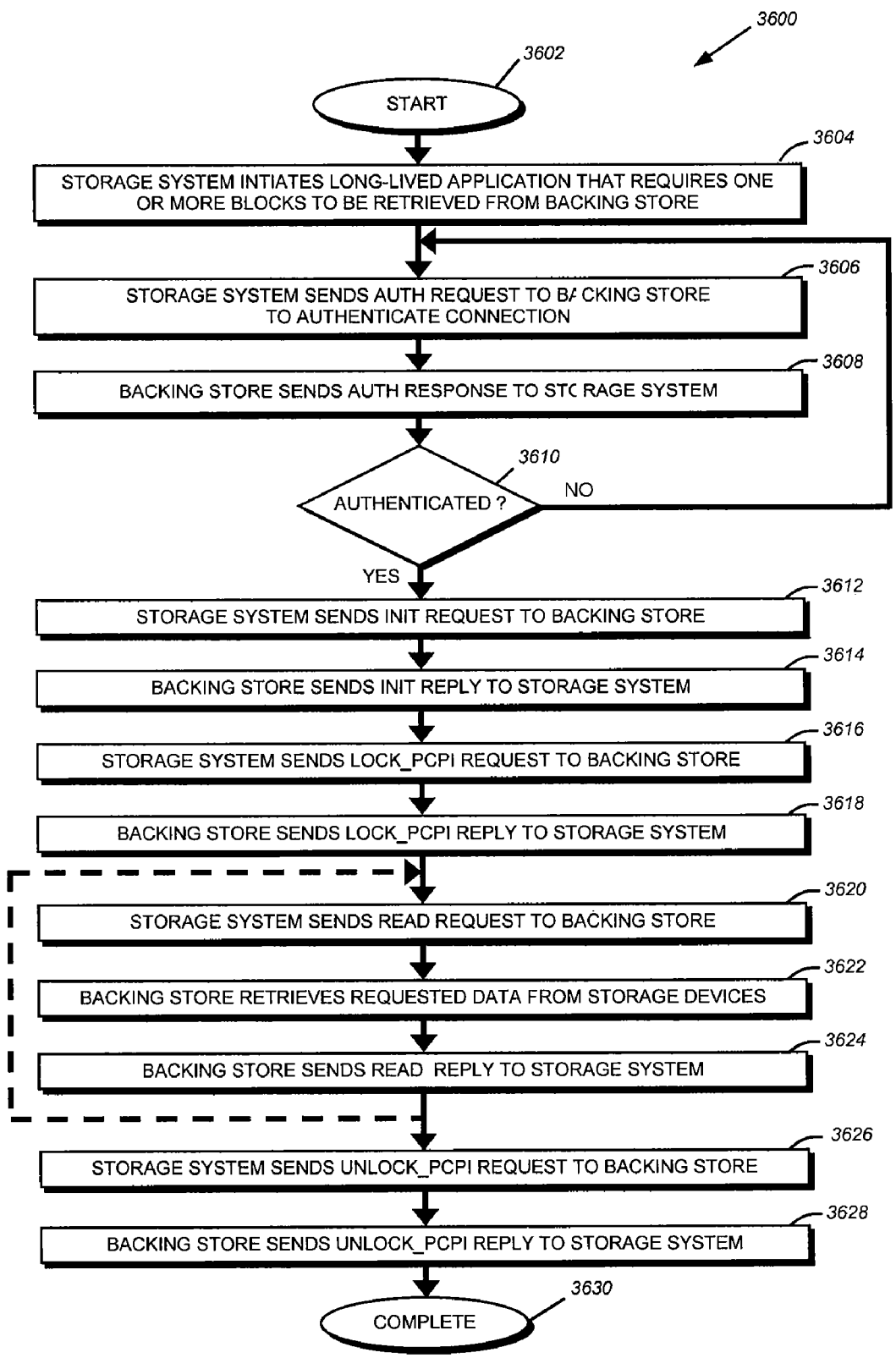
FIG. 32 is a flow chart detailing the steps of a procedure showing the use of the LOCK_PCPI command in accordance with an embodiment of the present convention.

FIG. 32 is a flow chart detailing the steps of a procedure 3600 for using the lock PCPI command with a long-lived application. The procedure begins in step 2702 and continues to step 3604 were the storage system initiates a long-lived application that requires one or more blocks to be retrieved from the backing store. The long-live application may comprise a restore on demand application or any other application that may require continued use of a particular file or PCPI on the backing store. The storage appliance then sends an AUTH request (step 3606) to the backing store to authenticate the connection. In response, the backing store transmits an AUTH response to the storage appliance in step 3608. In step 3610, a determination is made as to whether the connection is authenticated. If not, the procedure loops back to step 3606. Otherwise, the procedure continues to step 3612 where the storage system transmits an INIT request to the backing store, which responds (in step 3614) by sending an INIT response. Once the communication has been authenticated and initialized, the storage system sends a lock PCPI request to the backing store in step 3616 that identifies the appropriate PCPI to be locked. In response, the backing store locks the requested PCPI and send a lock PCPI reply to the storage appliance in step 3618.

The storage appliance may then send a READ request to the backing store in step 3620. In response, the backing store retrieves the requested data from its storage devices in step 3622 and a sends a READ reply, including the requested data, to the storage appliance in step 3624. It should be noted that during the course of the long-lived application, steps to 3620-3624 may be repeated a plurality of times. Additionally, alternate commands other than a READ request may be issued by the storage appliance to the backing store. In response to such alternate commands, the backing store processes the received commands in accordance with the protocol specification as described above. At some point in time, when the long-lived application no longer requires the use of the particular PCPI, the storage appliance sends an unlock PCPI request to the backing store (step 3626). In response, the backing store unlocks the identified PCPI and sends an unlock PCPI reply to the storage appliance in step 3628. The procedure then completes in step 3630.

To again summarize, the present invention is directed to system and method for supporting a sparse volume within a file system of a storage system. In accordance with the illustrative embodiment a storage operating system executing on a storage appliance includes a NRV protocol module that implements the NRV protocol. The NRV protocol module interfaces with the file system to provide remote retrieval of data from a backing store. The NRV protocol illustratively utilizes the TCP/IP protocol as a transport protocol. The NRV protocol module is invoked by an exemplary Load-Block( ) function within a file system that determines whether a block is to be retrieved from the remote backing store. If so, the Load_Block( ) function initiates a series of NRV protocol requests to the backing store to retrieve the data.

The NRV protocol module first authenticates the connection and then transmits an initialization request to match the appropriate information required at the beginning of the connection. Once the NRV protocol connection has been initialized and authenticated, various types of data may be retrieved from the backing store including, for example, information relating to volumes, blocks and files or other data containers stored on the backing store. Additionally, the NRV protocol provides a mechanism to remotely lock a PCPI (a lock PCPI request) on the backing store so that the backing store does not modify or delete the PCPI until it is unlocked via an unlock command (an unlock PCPI request) sent via the NRV protocol. Such locking may be utilized when the backing store is instantiated within a PCPI that is required for a long-lived the application on the storage appliance, such as a restore on demand application. The NRV protocol also includes commands for retrieving status information such as volume information, from the backing store. This may be accomplished by sending a VOLINFO request to the backing store identifying the particular volume of interest.

The present invention provides a NRV protocol that provides several noted advantages over using conventional open protocols. One noted advantage is the transparency of operations. Existing open protocols such as the network file system protocol (NFS) do not expose side effects file system operations, such as that generated a rename operation, which implicitly deletes a target file. Conventional protocols do not inform a client that the file handle of the file that has been deleted. However, certain applications of the NRV protocol may be interested in such information to ensure that cache contents can be invalidated at the appropriate times. A second noted advantage is that the NRV protocol of the present invention exposes file system metadata. Conventional protocols, such as NFS. do not expose file system-specific metadata, but rather normalizes the information into a standard format, which may be lossy in that it does not convey some file system specific information. In one alternate embodiment of the present invention, certain features of the NRV protocol may be implemented using a conventional open protocol coupled with an extension protocol that provides the desired functionality necessary for implementing sparse volumes. In such an environment, an open protocol, such as the NFS protocol would be coupled to the NRV protocol. In such an environment the NRV 295 would be configured to utilize the NFS protocol for certain file system operations directed to a backing store.

What is claimed is:

1. A method comprising:
   receiving a read request at a local storage server, the read request indicating client-requested data for a storage operating system to retrieve the client-requested data from a data container; and responsive to the receiving of the read request, utilizing a readahead engine to issue a readahead request, wherein:
 a portion of the readahead request for a set of data blocks that can be read from a local storage system is delivered to the local storage system, and
 a portion of the readahead request for another set of data blocks that can be read from a remote storage system is delivered to the remote storage system;
 and wherein issuance of the readahead request includes communication of a hint from the local storage server to a remote storage server which manages the remote storage system, the hint including a data structure which includes a plurality of parameters and indicates a read access pattern;
 the hint for use at the remote storage system to identify data to retrieve in response to the readahead request.

2. The method of claim 1, wherein the readahead request is a speculative readahead request or a client-driven readahead request.

3. The method of claim 1, further comprising coalescing remote requests.

4. The method of claim 3, wherein the coalescing of the read requests comprises:
 responsive to identifying a new remote request for data, identifying an existing outstanding remote request for the data; and
 canceling the new remote request for the data.

5. The method of claim 4, wherein the identifying of the existing outstanding remote request for the data includes parsing a list of outstanding remote requests.

6. The method of claim 1, wherein issuance of the readahead request comprises issuing a readahead request for a plurality of data blocks, wherein each request for a data block from a plurality of requests has an associated header indicating that the data block is from the plurality of requested data blocks.

7. The method of claim 1, further comprising:
 selecting an amount of readahead data to retrieve based on one or more factors; and
 retrieving the selected amount of readahead data.

8. The method of claim 7, wherein the one or more factors include historical information about prior requests associated with the data container.

9. The method of claim 1, wherein the hint is generated utilizing the historical information.

10. The method of claim 1, wherein the data container is a sparse volume.

11. A storage server comprising:
 a file system protocol layer to receive a client read request, the client read request indicating client-requested data for the storage operating system to retrieve from the data container; and
 a readahead engine to issue a readahead request in response to the received read request, wherein:
  a portion of the readahead request for a set of data blocks that can be read from a local storage system is delivered to the local storage system, and
  a portion of the readahead request for another set of data blocks that can be read from a remote storage system is delivered to the remote storage system; and
  wherein issuance of the readahead request includes communication of a hint from the storage server to a remote storage server which manages the remote storage system, the hint including a data structure which includes a plurality of parameters and indicates a read access pattern, the hint for use at the remote storage system to identify data to retrieve in response to the readahead request.

12. The storage server of claim 11 further comprising a request path, the request path having a speculative readahead component and a client-driven readahead component.

13. The storage server of claim 11, further including:
 a fetch on demand component to receive a new remote request;
 a buffer to store outstanding remote requests; and
 a request coalescing component to coalesce redundant read requests.

14. The storage server of claim 13, wherein the request coalescing component is to identify an existing outstanding remote request for the data; and
 to cancel the new remote request for the data.

15. The storage server of claim 14, wherein the identifying of the existing outstanding remote request for the data includes parsing the buffer that stores outstanding remote requests.

16. The storage server of claim 11, wherein issuance of the readahead requests includes:
 issuing a readahead request for a plurality of data blocks, wherein each request for a data block from the plurality of requests has an associated header indicating that the data block is from the plurality of requested data blocks.

17. The storage server of claim 11, further comprising:
 logic to select an amount of readahead data to retrieve based on one or more factors; and
 logic to retrieve the selected amount of readahead data.

18. The storage server of claim 17, wherein the one or more factors include historical information about prior requests associated with the data container.

19. The storage server of claim 18, wherein the hint is generated utilizing the historical information.

20. The storage server of claim 11, wherein the data container is a sparse volume.

21. A method comprising:
 receiving a read request at a front-end system, the read request indicating client-requested data for a storage operating system to retrieve from a data container;
 determining in the front-end system that the client-requested data is stored at a back-end system;
 accessing historical information associated with prior read requests;
 utilizing the historical information to generate, in the front-end system, a hint that includes a data structure which includes a plurality of parameters and indicates a read access pattern;
 communicating the hint from the front-end system to the back-end system; and
 utilizing the hint to service a readahead request associated with the read request.

22. A machine-readable program storage medium having stored thereon data representing sets of instructions which, when executed by a machine, cause the machine to:
 receive a client read request at a local storage server, the client read request indicating client-requested data for the storage operating system to retrieve from the data container; and
 issue a readahead request in response to the received read request, wherein:
  a portion of the readahead request that can be read from a local storage system is delivered to the local storage system, and a portion of the readahead request that can be read from a remote storage system is delivered to the remote storage system;

and wherein issuance of the readahead request includes communication of a hint from the local storage server to a remote storage server which manages the remote storage system, the hint including a data structure which includes a plurality of parameters and indicates a read access pattern, the hint for use at the remote storage system to identify data to retrieve in response to the readahead request.

23. The method of claim 1, wherein the hint includes an indication of how many data blocks to retrieve, an indication of how many of the data blocks to retrieve are must-read data blocks, and an indication of how many of the data blocks to retrieve are speculative readahead data blocks.

24. The storage server of claim 11, wherein the hint includes an indication of how many data blocks to retrieve, an indication of how many of the data blocks to retrieve are must-read data blocks, and an indication of how many of the data blocks to retrieve are speculative readahead data blocks.

25. The method of claim 21, wherein the hint includes an indication of how many data blocks to retrieve, an indication of how many of the data blocks to retrieve are must-read data blocks, and an indication of how many of the data blocks to retrieve are speculative readahead data blocks.

26. The machine-readable program storage medium of claim 22, wherein the hint includes an indication of how many data blocks to retrieve, an indication of how many of the data blocks to retrieve are must-read data blocks, and an indication of how many of the data blocks to retrieve are speculative readahead data blocks.

* * * * *